(12) United States Patent
Mori et al.

(10) Patent No.: US 12,724,405 B2
(45) Date of Patent: Sep. 1, 2026

(54) QUALITY IMPROVEMENT ASSISTING DEVICE AND QUALITY IMPROVEMENT ASSISTING SYSTEM

(71) Applicant: OMRON Corporation, Kyoto (JP)

(72) Inventors: Hiroyuki Mori, Kyoto (JP); Keita Saji, Kyoto (JP); Mayuko Tanaka, Kyoto (JP); Katsuki Nakajima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 405 days.

(21) Appl. No.: 18/259,736

(22) PCT Filed: Mar. 11, 2021

(86) PCT No.: PCT/JP2021/009839
§ 371 (c)(1),
(2) Date: Jun. 28, 2023

(87) PCT Pub. No.: WO2022/162963
PCT Pub. Date: Aug. 4, 2022

(65) Prior Publication Data

US 2024/0085896 A1 Mar. 14, 2024

(30) Foreign Application Priority Data

Jan. 29, 2021 (JP) ................................ 2021-012888

(51) Int. Cl.
*G05B 23/02* (2006.01)

(52) U.S. Cl.
CPC ................................ *G05B 23/0216* (2013.01)

(58) Field of Classification Search
CPC ...... G05B 23/0216; G05B 2219/45026; G05B 19/41875; G06Q 10/06395; G06Q 50/04; H05K 13/083
See application file for complete search history.

(56) References Cited

U.S. PATENT DOCUMENTS 6,633,782 B1 * 10/2003 Schleiss ............ G05B 23/0229 700/86
2002/0082736 A1 * 6/2002 Lech ..................... G06Q 10/06 700/109

(Continued)

FOREIGN PATENT DOCUMENTS

CN 111598259 A 8/2020
CN 111724120 A 9/2020

(Continued)

OTHER PUBLICATIONS

International Search Report issued in Intl. Appln. No. PCT/JP2021/009839 mailed Jun. 8, 2021. English translation provided.

(Continued)

*Primary Examiner* — Christopher E. Everett
(74) *Attorney, Agent, or Firm* — ROSSI, KIMMS & McDOWELL LLP

(57) ABSTRACT

A quality improvement support apparatus that supports improvement in quality of a product produced by a production facility, including: a display unit that displays production condition information in which identification information, operation instruction state information, and a condition evaluation index are associated with each other for each operation instruction, the identification information identifying an improvement target that is a production member or a component included in the production facility and that is to be improved to improve quality of the product, the operation instruction state information indicating a state of an operation instruction to perform an operation in relation to the improvement target, the condition evaluation index being an index for evaluating conditions of the production facility relating to the quality of the product; and an additional operation instruction accepting unit accepting an additional operation instruction for additionally giving an (Continued)

instruction to perform an operation on the production facility.

10 Claims, 14 Drawing Sheets

(56) References Cited

U.S. PATENT DOCUMENTS

| | | | | |
|---|---|---|---|---|
| 2006/0167579 | A1 | 7/2006 | Fujii et al. | |
| 2008/0228307 | A1 | 9/2008 | Mori et al. | |
| 2008/0288321 | A1* | 11/2008 | Dillon | G05B 23/0283 705/7.13 |
| 2018/0364687 | A1* | 12/2018 | Tan | H05K 13/083 |
| 2021/0149364 | A1 | 5/2021 | Hando et al. | |
| 2021/0150446 | A1 | 5/2021 | Kato et al. | |

FOREIGN PATENT DOCUMENTS

| | | | |
|---|---|---|---|
| JP | 2008257700 | A | 10/2008 |
| JP | 2009104523 | A | 5/2009 |
| WO | 2012032900 | A1 | 3/2012 |
| WO | 2018020556 | A1 | 2/2018 |
| WO | 2018020594 | A1 | 2/2018 |

OTHER PUBLICATIONS

Written Opinion issued in Intl. Appln. No. PCT/JP2021/009839 mailed Jun. 8, 2021. English translation provided.

Office Action issued in Chinese Appln. No. 202180088546.5, mailed Aug. 27, 2025.

* cited by examiner

X1
Y1
X2
Y2
X3
Y3
Y4
10
100
1
40
20
50

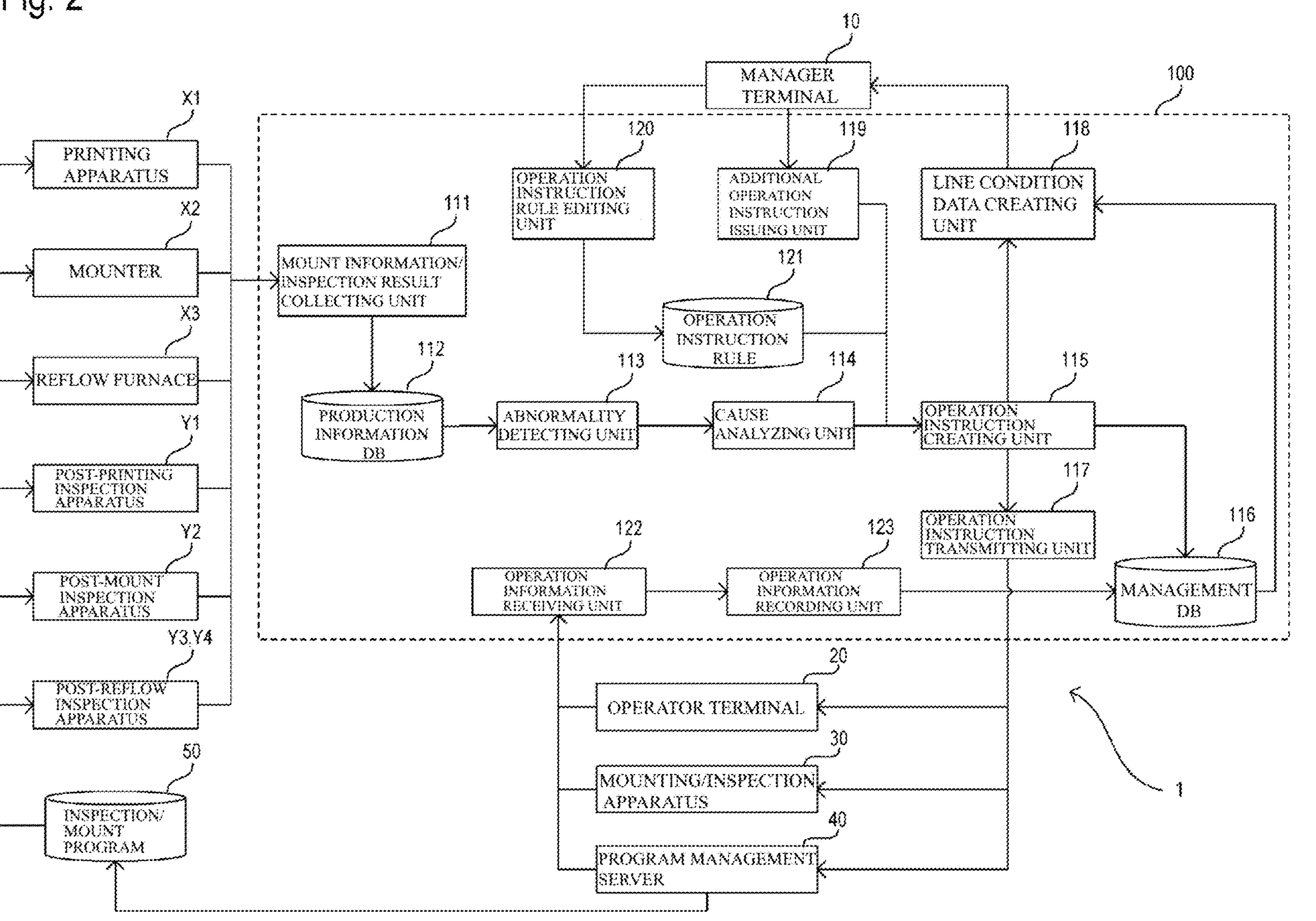
Fig. 2
10
MANAGER TERMINAL
100
X1
PRINTING APPARATUS
X2
MOUNTER
X3
REFLOW FURNACE
Y1
POST-PRINTING INSPECTION APPARATUS
Y2
POST-MOUNT INSPECTION APPARATUS
Y3,Y4
POST-REFLOW INSPECTION APPARATUS
50
INSPECTION/ MOUNT PROGRAM
120
OPERATION INSTRUCTION RULE EDITING UNIT
119
ADDITIONAL OPERATION INSTRUCTION ISSUING UNIT
118
LINE CONDITION DATA CREATING UNIT
111
MOUNT INFORMATION/ INSPECTION RESULT COLLECTING UNIT
121
OPERATION INSTRUCTION RULE
112
PRODUCTION INFORMATION DB
113
ABNORMALITY DETECTING UNIT
114
CAUSE ANALYZING UNIT
115
OPERATION INSTRUCTION CREATING UNIT
117
OPERATION INSTRUCTION TRANSMITTING UNIT
122
OPERATION INFORMATION RECEIVING UNIT
123
OPERATION INFORMATION RECORDING UNIT
116
MANAGEMENT DB
20
OPERATOR TERMINAL
30
MOUNTING/INSPECTION APPARATUS
40
PROGRAM MANAGEMENT SERVER
1

Fig. 6

| CIRCUIT BOARD ID | COMPONENT NO. | NOZZLE ID | FEEDER ID | NUMBER OF IMAGE PROCESSING ERRORS | NUMBER OF COMPONENT PICKUP ERRORS | ... |
|---|---|---|---|---|---|---|
| B001 | P01 | NZ0001 | FD0001 | ... | ... | ... |
| B001 | P02 | NZ0003 | FD0003 | ... | ... | ... |
| B001 | P03 | NZ0004 | FD0005 | ... | ... | ... |
| ... | ... | ... | ... | ... | ... | ... |
| B002 | P01 | NZ0001 | FD0002 | ... | ... | ... |
| B002 | P02 | NZ0003 | FD0003 | ... | ... | ... |
| ... | ... | ... | ... | ... | ... | ... |

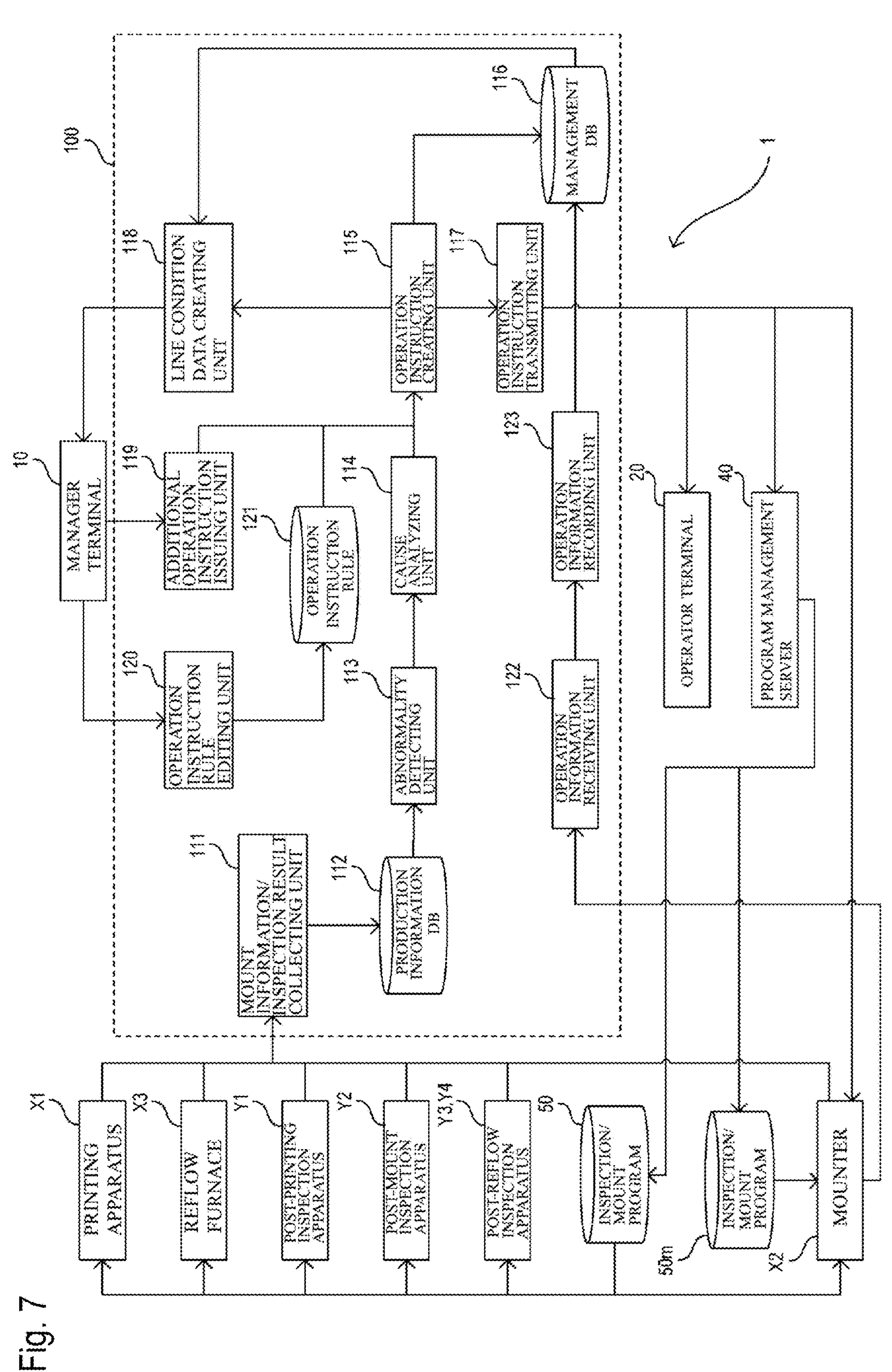
Fig. 7
100
10
MANAGER TERMINAL
118
LINE CONDITION DATA CREATING UNIT
116
MANAGEMENT DB
1
119
ADDITIONAL OPERATION INSTRUCTION ISSUING UNIT
115
OPERATION INSTRUCTION CREATING UNIT
117
OPERATION INSTRUCTION TRANSMITTING UNIT
120
OPERATION INSTRUCTION RULE EDITING UNIT
121
OPERATION INSTRUCTION RULE
114
CAUSE ANALYZING UNIT
113
ABNORMALITY DETECTING UNIT
123
OPERATION INFORMATION RECORDING UNIT
122
OPERATION INFORMATION RECEIVING UNIT
20
OPERATOR TERMINAL
40
PROGRAM MANAGEMENT SERVER
111
MOUNT INFORMATION/ INSPECTION RESULT COLLECTING UNIT
112
PRODUCTION INFORMATION DB
X1
PRINTING APPARATUS
X3
REFLOW FURNACE
Y1
POST-PRINTING INSPECTION APPARATUS
Y2
POST-MOUNT INSPECTION APPARATUS
Y3,Y4
POST-REFLOW INSPECTION APPARATUS
50
INSPECTION/ MOUNT PROGRAM
50m
INSPECTION/ MOUNT PROGRAM
X2
MOUNTER

Fig. 9

| ICON | CONTENT | STATE | ACTION |
|---|---|---|---|
| | OPERATION INSTRUCTION NOTIFICATION WAS GIVEN (CURRENTLY DISPLAYED) | STATUS OF LATEST OPERATION INSTRUCTION FOR IMPROVEMENT TARGET IS "NOT DONE" | WAIT FOR OPERATION TO BE PERFORMED OR INSTRUCT OPERATOR TO PERFORM OPERATION |
| | IMPROVEMENT OPERATION HAS BEEN DONE | STATUS OF LATEST OPERATION INSTRUCTION FOR IMPROVEMENT TARGET IS "DONE" | CONFIRM EFFECT |
| | IMPROVEMENT OPERATION HAS NOT BEEN ASSIGNED | STATUS OF LATEST OPERATION INSTRUCTION FOR IMPROVEMENT TARGET IS "NOT ASSIGNED" | EXAMINE OPERATION INSTRUCTION CONTENT AND GIVE OPERATION INSTRUCTION TO OPERATOR |
| | EXCEEDED MAXIMUM NUMBER OF SIMULTANEOUS NOTIFICATIONS (DISPLAY ENDED) | STATUS OF LATEST OPERATION INSTRUCTION FOR IMPROVEMENT TARGET IS "EXCEEDING MAXIMUM NUMBER OF SIMULTANEOUS NOTIFICATIONS" | OPERATION HAS NOT BEEN DONE BUT DISPLAY WAS ENDED, SO GIVE RENOTIFICATION |
| | WAITING FOR IMPROVEMENT OPERATION INSTRUCTION TO BE OBTAINED | STATUS OF LATEST OPERATION INSTRUCTION FOR IMPROVEMENT TARGET IS "WAITING FOR REQUEST TO OBTAIN" | CONFIRM WHETHER OPERATION INSTRUCTION APP IS SET TO RECEIVE NOTIFICATION |

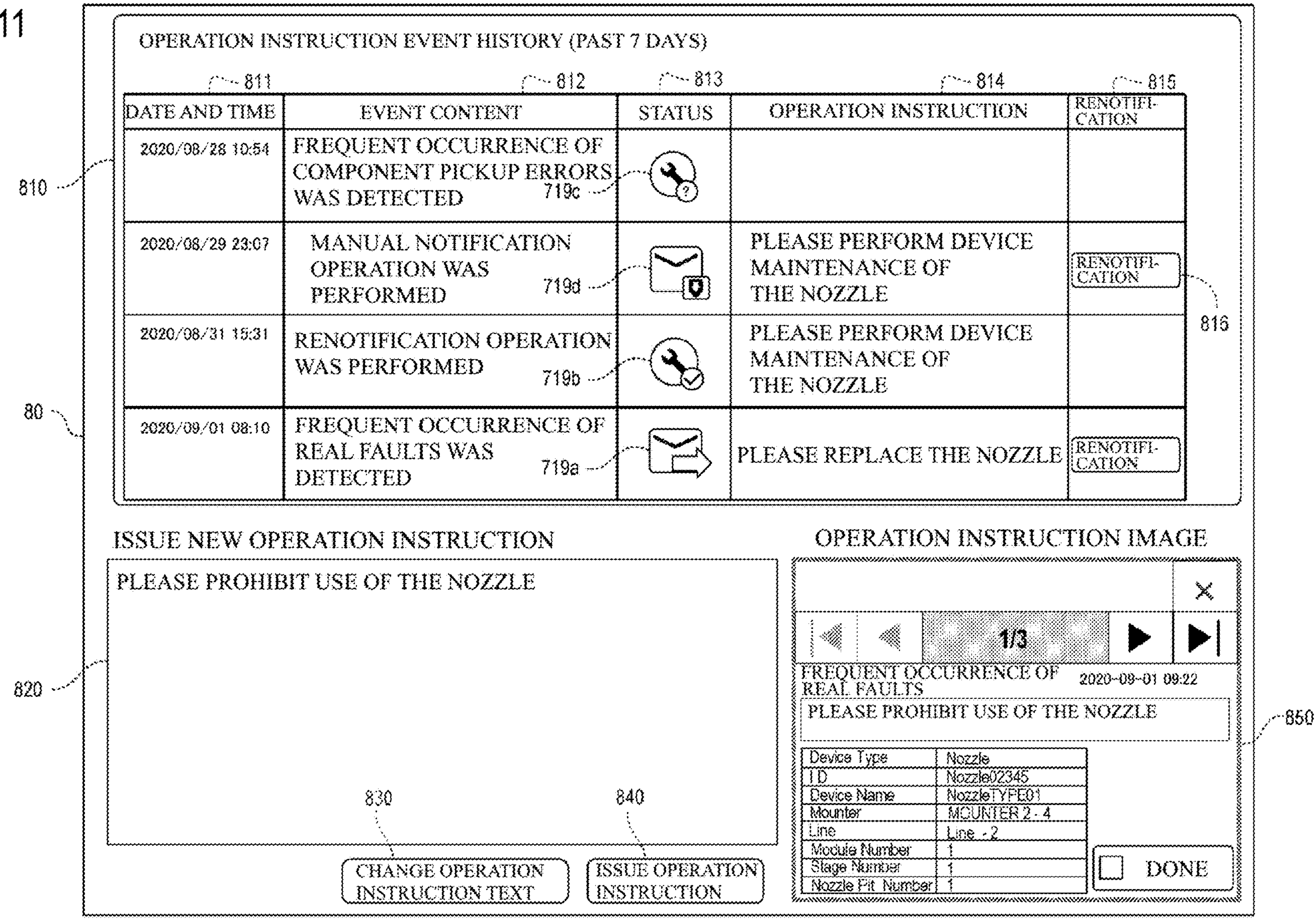
Fig. 11
OPERATION INSTRUCTION EVENT HISTORY (PAST 7 DAYS)
811
812
813
814
815
DATE AND TIME
EVENT CONTENT
STATUS
OPERATION INSTRUCTION
RENOTIFI-CATION
2020/08/28 10:54
FREQUENT OCCURRENCE OF COMPONENT PICKUP ERRORS WAS DETECTED
719c
2020/08/29 23:07
MANUAL NOTIFICATION OPERATION WAS PERFORMED
719d
PLEASE PERFORM DEVICE MAINTENANCE OF THE NOZZLE
RENOTIFI-CATION
816
2020/08/31 15:31
RENOTIFICATION OPERATION WAS PERFORMED
719b
PLEASE PERFORM DEVICE MAINTENANCE OF THE NOZZLE
2020/09/01 08:10
FREQUENT OCCURRENCE OF REAL FAULTS WAS DETECTED
719a
PLEASE REPLACE THE NOZZLE
RENOTIFI-CATION
810
80
820
ISSUE NEW OPERATION INSTRUCTION
PLEASE PROHIBIT USE OF THE NOZZLE
830
840
CHANGE OPERATION INSTRUCTION TEXT
ISSUE OPERATION INSTRUCTION
OPERATION INSTRUCTION IMAGE
1/3
FREQUENT OCCURRENCE OF REAL FAULTS
2020-09-01 09:22
PLEASE PROHIBIT USE OF THE NOZZLE
Device Type Nozzle
I D Nozzle02345
Device Name NozzleTYPE01
Mounter MOUNTER 2 - 4
Line Line - 2
Module Number 1
Stage Number 1
Nozzle Fit Number 1
DONE
850

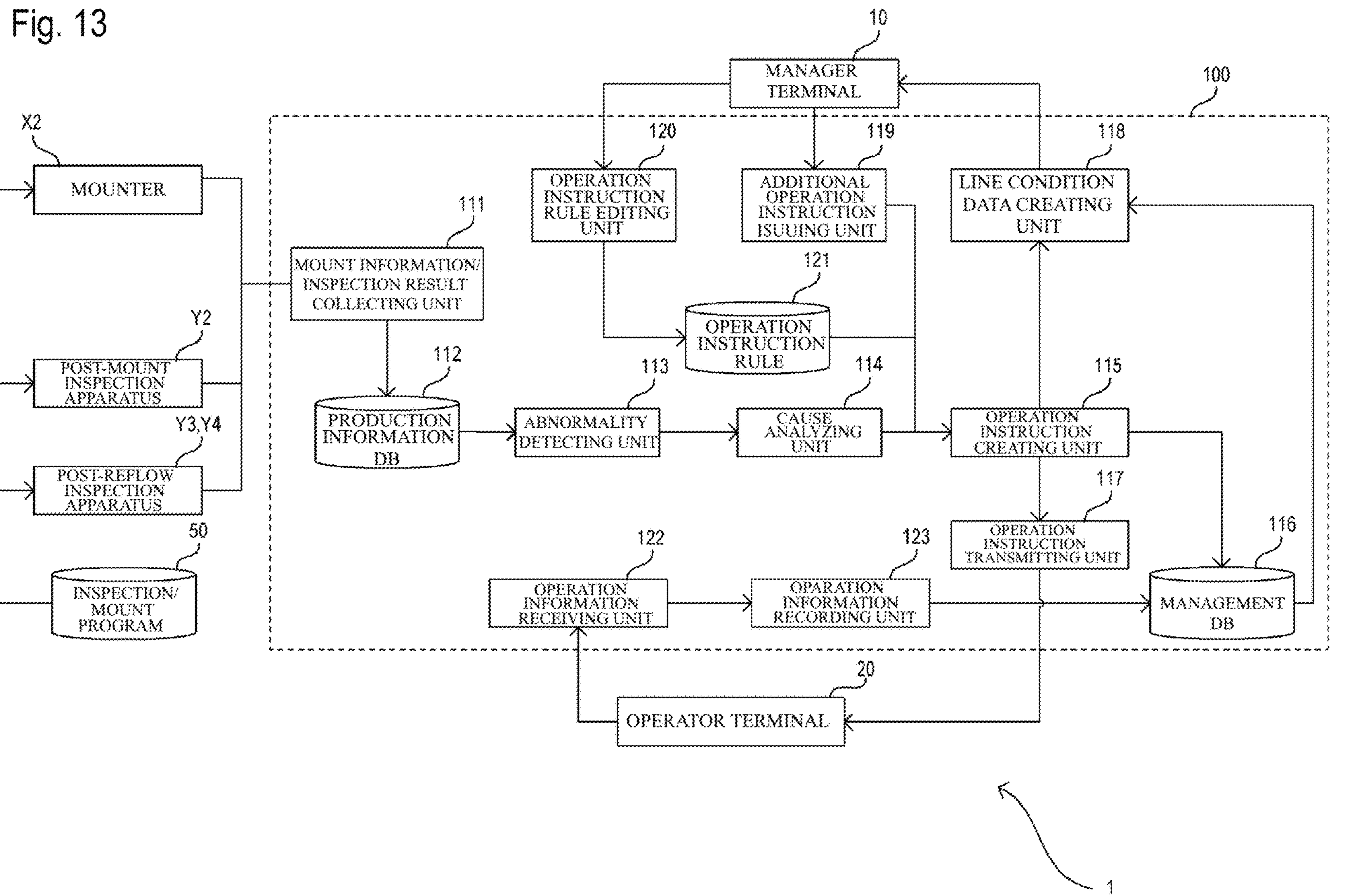
Fig. 13
10
MANAGER TERMINAL
100
X2
MOUNTER
120
OPERATION INSTRUCTION RULE EDITING UNIT
119
ADDITIONAL OPERATION INSTRUCTION ISUUING UNIT
118
LINE CONDITION DATA CREATING UNIT
111
MOUNT INFORMATION/ INSPECTION RESULT COLLECTING UNIT
121
OPERATION INSTRUCTION RULE
Y2
POST-MOUNT INSPECTION APPARATUS
112
PRODUCTION INFORMATION DB
113
ABNORMALITY DETECTING UNIT
114
CAUSE ANALYZING UNIT
115
OPERATION INSTRUCTION CREATING UNIT
Y3,Y4
POST-REFLOW INSPECTION APPARATUS
117
OPERATION INSTRUCTION TRANSMITTING UNIT
50
INSPECTION/ MOUNT PROGRAM
122
OPERATION INFORMATION RECEIVING UNIT
123
OPARATION INFORMATION RECORDING UNIT
116
MANAGEMENT DB
20
OPERATOR TERMINAL
1

QUALITY IMPROVEMENT ASSISTING DEVICE AND QUALITY IMPROVEMENT ASSISTING SYSTEM

TECHNICAL FIELD

The present invention relates to a quality improvement support apparatus and a quality improvement support system that support product quality improvement in a production facility for producing printed circuit boards or the like.

RELATED ART

As a conventional quality improvement support apparatus that supports product quality improvement in a production apparatus for producing printed circuit boards or the like, an apparatus has been proposed that gives operation instructions in various manners to deal with abnormalities occurring in the production apparatus. For example, Patent Document 1 describes an apparatus in which authority levels of operators who are allowed to perform an operation to deal with an abnormality are set in accordance with the content of the operation, and that gives operation instructions in accordance with the level of each operator. Patent Document 2 describes an apparatus that escalates the rank of a person to be notified of an operation instruction to a higher rank or changes the content of the instructed operation to a more advanced one if an operator who received the operation instruction has not performed the operation.

However, feedback from operators regarding operation instructions are not sufficiently reflected in these quality improvement support apparatuses to make a more appropriate operation instruction by a manager.

Therefore, a cycle of the manager including operation instructions and a cycle of operators in the production site, which also includes operation instructions, have not functioned in an adaptable manner as cycles for improving quality.

RELATED ART DOCUMENTS

Patent Documents

Patent Document 1: WO2018/020556
Patent Document 2: WO2018/020594

SUMMARY OF THE INVENTION

Problem to be Solved by the Invention

The present invention was made in view of the problems described above, and has an object of providing technology that realizes support in such a manner that a cycle of a manager and a cycle of an operator function in an adaptable manner to improve the quality of a product in a production facility with an operation instruction serving as a trigger.

Means for Solving the Problems

An aspect of the present invention for solving the above-described problems is a quality improvement support apparatus that supports improvement in quality of a product produced by a production facility, the quality improvement support apparatus including:

a display unit that displays production condition information in which identification information, operation instruction state information, and a condition evaluation index are associated with each other for each operation instruction, the identification information identifying an improvement target that is a production member or a component included in the production facility and that is to be improved to improve quality of the product, the operation instruction state information indicating a state of an operation instruction to perform an operation on the production facility in relation to the improvement target, the condition evaluation index being an index for evaluating conditions of the production facility relating to the quality of the product; and an additional operation instruction accepting unit that accepts an additional operation instruction for additionally giving an instruction to perform an operation on the production facility.

The quality improvement support apparatus according to this aspect of the present invention includes the display unit that displays production condition information in which identification information, operation instruction state information, and a condition evaluation index are associated with each other for each operation instruction, the identification information identifying an improvement target that is a production member or a component included in the production facility and that is to be improved to improve quality of the product, the operation instruction state information indicating a state of an operation instruction to perform an operation on the production facility in relation to the improvement target, the condition evaluation index being an index for evaluating conditions of the production facility relating to the quality of the product. This display unit makes it possible to recognize the state of an operation instruction to perform an operation on the production facility, which was issued in relation to a specific improvement target, and conditions of the production facility relating to the quality of the product. The quality improvement support apparatus according to the present invention further includes the additional operation instruction accepting unit that accepts an additional operation instruction for additionally giving an instruction to perform an operation on the production facility. That is, the quality improvement support apparatus according to the present invention makes it possible to recognize the state of an operation instruction relating to an improvement target that is to be improved to improve the quality of the product and recognize conditions of the production facility relating to the quality of the product, and issue an additional operation instruction to improve the quality of the product, as necessary. Thus, a quality improvement cycle of a manager who manages the production facility to improve the quality of the product can be established. The cycle includes an operation instruction and involves issuing the operation instruction to improve the quality of the product, recognizing the state of the operation instruction, and issuing an additional operation instruction. An operator who receives the operation instruction to perform an operation on the production facility, which was issued in relation to the specific improvement target to improve the quality of the product, receives the additional operation instruction depending on the state of the received operation instruction, and thus, a quality improvement cycle including the operation instruction is established on the operator side as well. That is, the quality improvement support apparatus according to the above aspect of the present invention can support quality improvement in such a manner that the cycle of the manager and the cycle of the operator function in an adaptable manner to improve the quality of the product in the production facility, with the operation instruction serving as a trigger.

Here, the production member, which is the improvement target, may include a program executed in an apparatus included in the production facility. The operation performed on the production facility may be performed by a person who is the operator, an apparatus included in the production facility, or a program management apparatus that manages a program executed in the production facility.

Also, the additional operation instruction accepting unit does not necessarily have to be provided separately from the display unit, and may also be displayed in the display unit. Furthermore, the additional operation instruction accepting unit may be displayed on a screen in the display unit displaying the production condition information, or another screen to which the screen displaying the production condition information transitions.

In the present invention, the operation instruction state information may include whether or not the operation instructed with the operation instruction has been performed.

Even when an operation instruction relating to an improvement target is issued, the operation may not be performed for various reasons. Whether or not the instructed operation has been performed is information that is important to determine the content of an additional operation instruction and the necessity of the additional operation instruction. When such information is displayed as the operation instruction state information, it is possible to support quality improvement in such a manner that the cycle of the manager and the cycle of the operator function in a more adaptable manner to improve the quality of the product in the production facility, with the operation instruction serving as a trigger.

In the present invention, the production condition information may include chronological condition information showing the condition evaluation index and the operation instruction state information in a predetermined period in time series.

When such chronological condition information is displayed, it is possible to recognize the influence of the state of the operation instruction on the conditions of the production facility relating to the quality of the product, and accordingly, it is possible to make a more appropriate determination on the content and the necessity of an additional operation instruction. That is, it is possible to support quality improvement in such a manner that the cycle of the manager and the cycle of the operator function in a more adaptable manner to improve the quality of the product in the production facility, with the operation instruction serving as a trigger.

In the present invention, the display unit may display history information indicating the operation instruction issued in the past in relation to the improvement target identified by the identification information included in the production condition information.

When such history information of the operation instruction is displayed, it is possible to recognize not only the operation instruction corresponding to the operation instruction state information displayed in the display unit but also information regarding a previously-issued operation instruction relating to the improvement target, and accordingly, it is possible to make a more appropriate determination on the content and the necessity of an additional operation instruction in view of the history up to the operation instruction. That is, it is possible to support quality improvement in such a manner that the cycle of the manager and the cycle of the operator function in a more adaptable manner to improve the quality of the product in the production facility, with the operation instruction serving as a trigger.

In the present invention, the quality improvement support apparatus may further include a history information designation unit that accepts designation of any of a plurality of pieces of the production condition information displayed in the display unit and causes the display unit to display the history information relating to an improvement target identified by the identification information included in the designated production condition information.

According to this configuration, it is possible to effectively use the display space of the display unit because history information can be displayed using the history information designation unit as necessary based on the operation instruction state information and the condition evaluation index included in the production condition information displayed in the display unit.

In the present invention, the additional operation instruction accepting unit may accept the same operation instruction as the operation instruction issued in the past and included in the history information.

According to this configuration, it is possible to easily issue an instruction to perform a previously-instructed operation included in the history information.

In the present invention, the additional operation instruction accepting unit may accept an operation instruction that is different from the operation instruction issued in the past and included in the history information.

According to this configuration, it is also possible to issue an instruction to perform an operation that has not been instructed, based on the operation instruction state information and the condition evaluation index.

Another aspect of the present invention is a quality improvement support system including:

the quality improvement support apparatus; and an operation instruction receiving apparatus that receives the operation instruction including the additional operation instruction, and includes:

an operation instruction state information obtaining unit that obtains the operation instruction state information regarding the operation instruction; and an operation instruction state information transmitting unit that transmits the obtained operation instruction state information, wherein the operation instruction state information displayed in the display unit of the quality improvement support apparatus is updated based on the operation instruction state information obtained by the operation instruction state information obtaining unit.

In the quality improvement support system according to this aspect of the present invention, operation instruction state information displayed in the quality improvement support apparatus is updated based on operation instruction state information obtained by the operation instruction receiving apparatus. Accordingly, a quality improvement cycle including an operation instruction is established with use of the operation instruction receiving apparatus, for an operator who receives the operation instruction to perform an operation on the production facility, which was issued in relation to a specific improvement target to improve the quality of the product.

In the present invention, the operation instruction receiving apparatus may further include an instruction content display unit that displays content of the received operation instruction, and the operation instruction state information obtaining unit may accept input of the operation instruction state information from a user of the operation instruction receiving apparatus.

According to this configuration, in a case where the instructed operation relating to the improvement target is performed on the production facility by the operator who is a person, the operator can recognize the content of the operation instruction with use of the instruction content display unit, and input operation instruction state information with use of the operation instruction state information obtaining unit of the operation instruction receiving apparatus. Therefore, in the quality improvement support system according to this aspect of the present invention, a quality improvement cycle including an operation instruction can be established with use of the operation instruction receiving apparatus, for the operator who is a person. The user who inputs the operation instruction state information may be the operator who performs the instructed operation, but does not necessarily have to be the operator.

Effects of the Invention

According to the present invention, it is possible to realize support in such a manner that a cycle of a manager and a cycle of an operator function in an adaptable manner to improve the quality of a product in a production facility with an operation instruction serving as a trigger.

BRIEF DESCRIPTION OF THE DRAWINGS

FIG. 2 is a functional block diagram of a management apparatus according to an embodiment of the present invention.

FIG. 6 is a diagram showing an example of production log data according to an embodiment of the present invention.

FIG. 7 is a functional block diagram of the management apparatus clarifying a relationship with a mounter according to an embodiment of the present invention.

FIG. 9 is a diagram for explaining icons that indicate the status of an operation instruction according to an embodiment of the present invention.

FIG. 11 is a diagram showing an example of an operation instruction issuing screen in the manager terminal according to an embodiment of the present invention.

FIG. 13 is a functional block diagram of the management apparatus according to an application example of the present invention.

EMBODIMENTS OF THE INVENTION

Application Example

The following describes an application example of the present invention with reference to the drawings.

Figure 1:
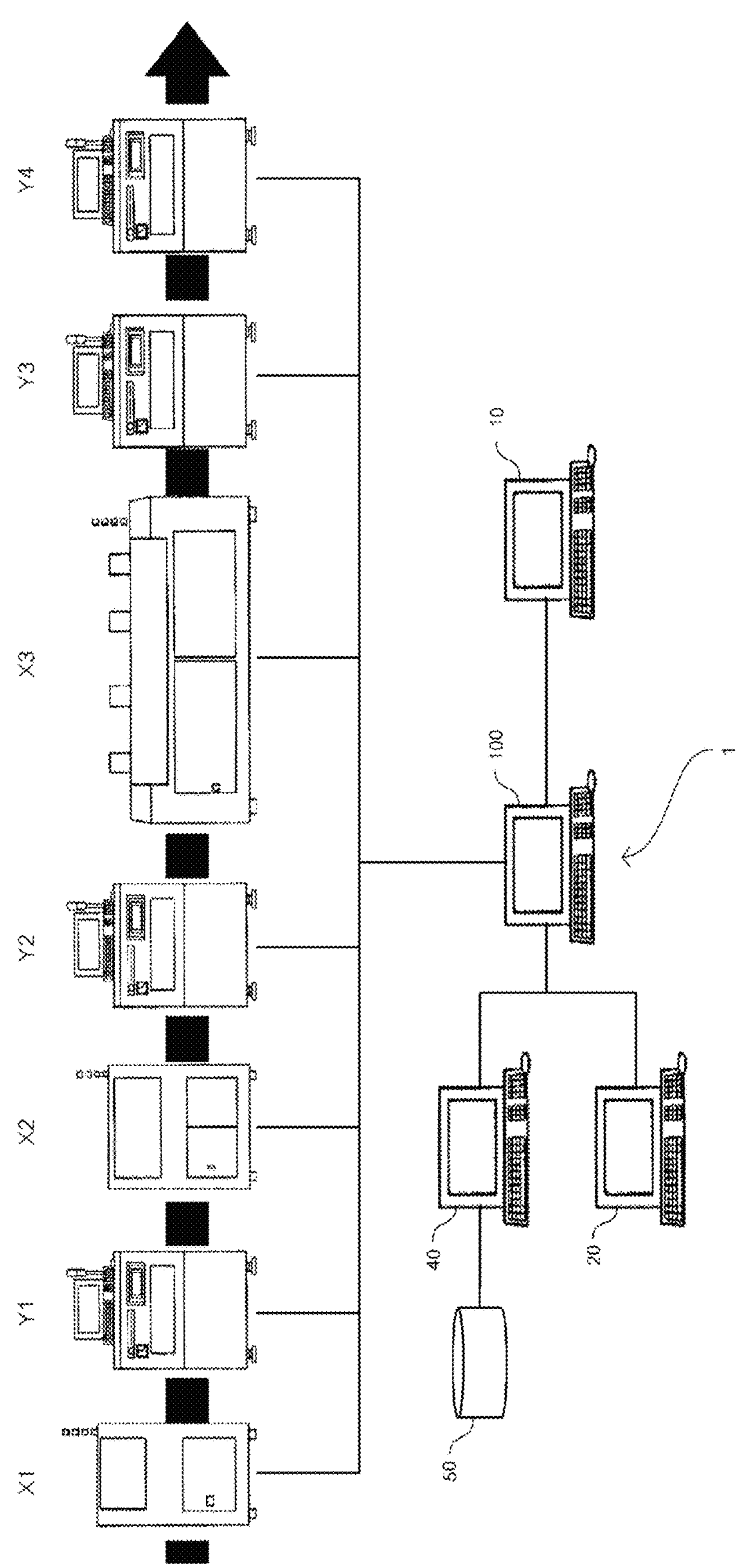
FIG. 1 is a diagram showing a schematic configuration of a production facility according to an embodiment of the present invention.

FIG. 13 shows a management system 1 to which the present invention is applied. The management system 1 includes a management apparatus 100 and a manager terminal 10 and an operator terminal 20 that are communicably connected to the management apparatus 100 via a network. A production facility included in a surface mount production line for printed circuit boards includes a mounter X2, a post-mount inspection apparatus Y2, and post-reflow inspection apparatuses Y3 and Y4 that are communicably connected to the management apparatus 100 via a network. The production facility includes a printing apparatus X1, a reflow furnace X3, and a post-printing inspection apparatus Y1 as shown in FIG. 1. The management apparatus 100 can be operated by being connected to these apparatuses as well via a network as descried later, but the following describes the management apparatus 100 in the configuration shown in FIG. 13. The manager terminal 10 corresponds to a quality improvement support apparatus in the present invention, and the operator terminal 20 corresponds to an operation instruction receiving apparatus in the present invention. Although a quality improvement support system according to the present invention can be applied to the management system 1, the quality improvement support system according to the present invention in the example shown in FIG. 13 includes at least the manager terminal 10 and the operator terminal 20.

A mount information/inspection result collecting unit 111 of the management apparatus 100 collects mount information from the mounter X2 and inspection results from the post-mount inspection apparatus Y2 and the post-reflow inspection apparatuses Y3 and Y4, and records the collected information and inspection results in a production information database (DB) 112. Here, the mount information and the inspection results correspond to facility condition information in the present invention.

An abnormality detecting unit 113 detects an abnormality in any component on a printed circuit board based on information recorded in the production information database 112. A cause analyzing unit 114 analyzes causes of the abnormality detected by the abnormality detecting unit 113.

An operation instruction creating unit 115 creates an operation instruction for solving the abnormality based on an operation instruction rule 121 in accordance with causes of the abnormality found through analysis by the cause analyzing unit 114. Non-limited examples of operation instructions relating to the mounter X2 include maintenance and replacement of a nozzle.

The operation instruction created by the operation instruction creating unit 115 is recorded in a management database 116 together with the site and conditions of the abnormality. Also, the operation instruction created by the operation instruction creating unit 115 is transmitted to the operator terminal 20 via an operation instruction transmitting unit 117.

Operation information regarding the status of response to the transmitted operation instruction information is input to the operator terminal 20. The operation corresponding to the instruction transmitted to the operator terminal 20 is not always performed and may not be performed. Therefore, when the instructed operation has been performed, information indicating that the operation has been performed is input to the operator terminal 20. In the case where information indicating that the operation has been performed is not input to the operator terminal 20, the operation has not been performed. That is, execution status information indicating whether or not the instructed operation has been performed is transmitted as the operation information from the operator terminal 20 to an operation information receiving unit 122 of the management apparatus 100. Here, the operation information corresponds to operation instruction state information in the present invention.

The operation information received by the operation information receiving unit 122 is recorded in the management database 116 in association with the site of the abnormality corresponding to the operation content by an operation information recording unit 123.

A line condition data creating unit 118 creates line condition data based on the operation instruction created by the operation instruction creating unit 115 and information recorded in the management database 116. Specifically, the line condition data constitutes a line condition data display screen 70 (see FIG. 8) and an operation instruction issuing screen 80 (see FIG. 11) displayed in a line condition data display unit 12 of the manager terminal 10. Data constituting the line condition data display screen 70 includes the number of alerts (including the number of alerts for which an operation has been done) 701, latest update date and time 702, a monitoring period 703, and an alert list 705. The alert list 705 includes a plurality of individual alert related information pieces 705*a* to 705*f*, and each individual alert related information piece 705*a* or the like includes an operation instruction status 706, information identifying the site of abnormalities (a device type 707, a device ID 708, a line 709, etc.), a real fault image 710, the number of errors 711 (the numbers of real faults 712, recognition errors 713, and pickup errors 714), the number of detected production fluctuations 715 (the number of fault signs 716), latest detection time 717, and a monitoring period/production fluctuation detection state 718. Data constituting the operation instruction issuing screen 80 includes, for example, an operation instruction event history 810 that is history information indicating operation instruction events in the past 7 days and including, with respect to each operation instruction relating to a device for which an alert was issued, date and time 811, the content 812 of an operation instruction event, the status 813 of the operation instruction, specific wording 814 of the operation instruction, and a renotification button 816 for giving a renotification. Here, the line condition data display unit 12 corresponds to a display unit in the present invention. The operation instruction status 706 corresponds to operation instruction state information in the present invention. Information identifying the site of abnormalities such as the device type 707 corresponds to identification information in the present invention. The real fault image 710, the number of errors 711 (the numbers of real faults 712, recognition errors 713, and pickup errors 714), the number of detected production fluctuations 715 (the number of fault signs 716), and the monitoring period error/production fluctuation detection state 718 correspond to condition evaluation indexes in the present invention. The individual alert related information pieces 705*a* to 705*f* and the alert list 705 including these information pieces correspond to production condition information in the present invention. The operation instruction event history 810, which is history information indicating operation instruction events in the past 7 days, corresponds to history information in the present invention.

Out of these, icons 719 displayed in the column of the operation instruction status 706 indicate various states of operation instructions like an icon 719*a* indicating that "an operation instruction notification was given (currently displayed)" and an icon 719*b* indicating that "an improvement operation has been done", as shown in FIG. 9. When a details screen display button 720 displayed in the first row in the column of the status 706 where these icons 719*a* are displayed is selected, the operation instruction issuing screen 80 shown in FIG. 11 is displayed. Here, the details screen display button 720 corresponds to a history information designation unit in the present invention.

The operation instruction issuing screen 80 displays the operation instruction event history 810, which is a history of past operation instructions relating to a nozzle for which the operation instruction in the selected first row was issued. The operation instruction event history 810 is composed of the date and time 811, the event content 812, the status 813, the operation instruction 814, and the renotification 815. For example, from information displayed in the columns of the date and time 811, the event content 812, the status 813, and the operation instruction 814, it is possible to recognize that frequent occurrence of real faults was detected at 8:10 on Sep. 1, 2020, and a notification of an operation instruction "please replace the nozzle" was given and is currently displayed. Also, the renotification button 816 is displayed in the column of the renotification 815. When the renotification button 816 is selected, it is possible to reissue an operation instruction of the same content as that corresponding to the operation instruction event displayed in the fourth row of the operation instruction event history 810. Here, the renotification button 816 corresponds to an additional operation instruction accepting unit in the present invention.

Furthermore, the operation instruction issuing screen 80 displays a new operation instruction issuing region 820 that enables the manager to input a text describing the content of a new operation instruction that is to be issued. Also, the operation instruction issuing screen 80 displays an operation instruction text change button 830 that is selected to change the text that has been input to the new operation instruction issuing region 820 and an operation instruction issuing button 840 that is selected to issue the operation instruction input to the new operation instruction issuing region 820. When the manager wants to create a new operation instruction by changing a previously-issued operation instruction such as "please perform device maintenance of the nozzle" to different wording, the manager uses the new operation instruction issuing region 820 to issue the new operation instruction. In such a case, the manager selects the operation instruction text change button 830 and inputs a new operation instruction to the new operation instruction issuing region 820. Here, a new operation instruction "please prohibit use of the nozzle" is input to the new operation instruction issuing region 820 by the manager. It is possible to check the content of the new operation instruction in an operation instruction image region 850 in which an image of a screen to be displayed in the operator terminal 20, which includes the operation instruction to be issued, is displayed. The manager can issue the new operation instruction by selecting the operation instruction issuing button 840. Here, the new operation instruction issuing region 820, the operation instruction text change button 830, and the operation instruction issuing button 840 correspond to the additional operation instruction accepting unit that accepts an operation instruction that is different from a previously-issued operation instruction in the present invention.

Figure 14:
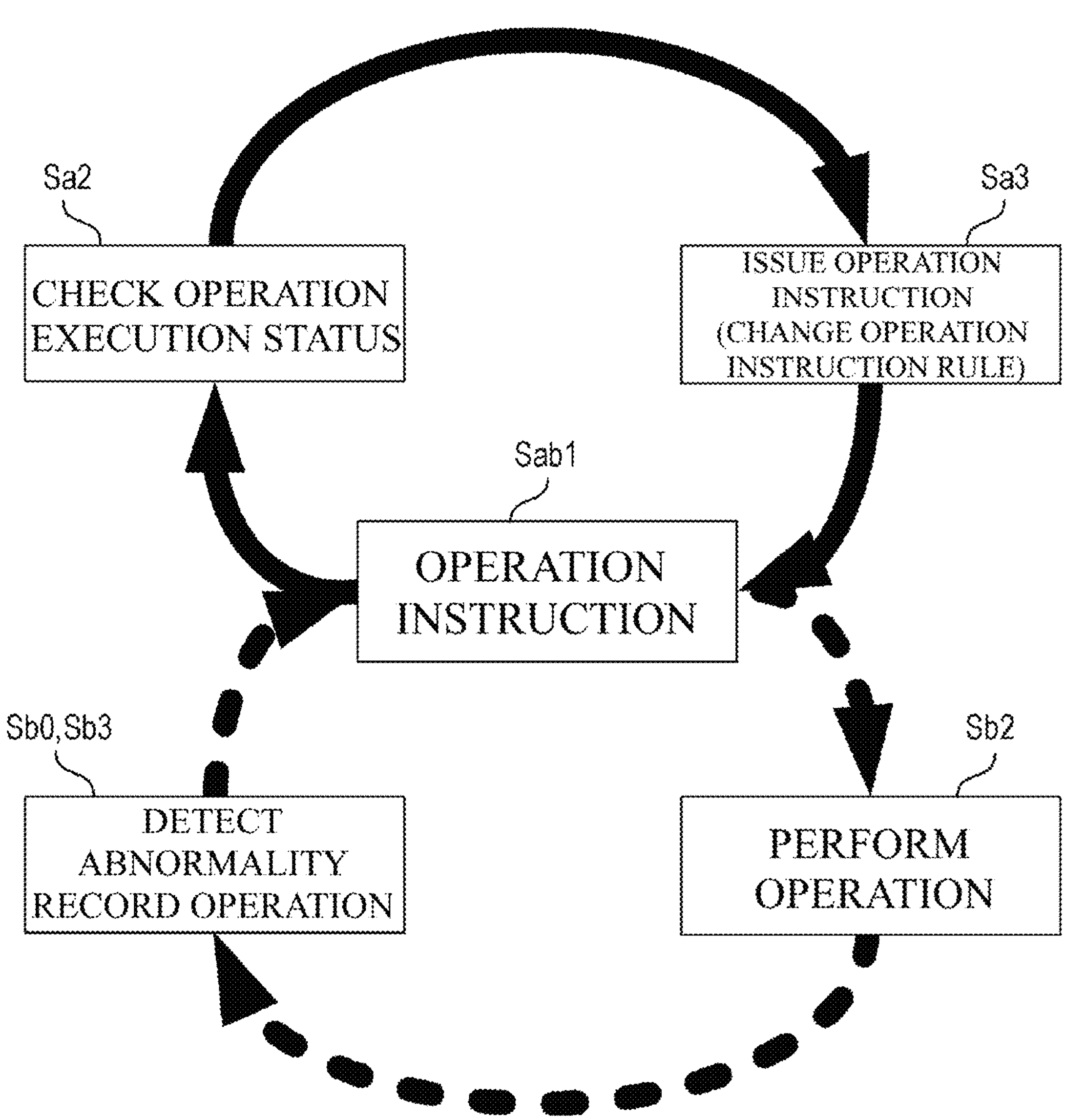
FIG. 14 is a schematic diagram showing characteristics of the present invention.

FIG. 14 is a schematic diagram showing characteristics of the present invention applied to the management system 1 described above. A cycle of steps connected by solid line arrows on the upper side in FIG. 14 schematically shows a manager-side cycle in a process for improving the quality of a product produced with use of a production facility, and a cycle of steps connected by broken line arrows on the lower side in FIG. 14 schematically shows an operator-side cycle in the same process for improving the quality. Here, a person, any of mounting apparatuses X1 to X3, any of inspection apparatuses Y1 to Y4, or a program management server 40 corresponds to the operator according to the operation content.

As shown in FIG. 14, the present invention integrates the manager-side cycle including Sab1, Sa2, Sa3, and Sab1 and the operator-side cycle including Sb0, Sab1, Sb2, Sb3 (Sb0), and Sab1 via an operation instruction Sab1 at the center and thus supports realization of a function of repeating a quality improvement cycle while improving the quality improvement cycle itself.

That is, an abnormality is detected in the production facility (Sb0), causes of the abnormality are analyzed, and an operation instruction is given to the operator (Sab1) based on the analysis result. Then, the operator performs (or does not perform) the instructed operation (Sb2), and records the execution status of the operation (Sb3). On the other hand, the manager checks the execution status of the instructed operation (Sa2) and again issues the operation instruction issued in the past (and may also change the operation instruction rule) in accordance with the execution status (Sa3), and thus the process returns to the operation instruction (Sab1). The operation instruction is further given (Sab1) on the operator side as well based on the operation record (Sb3). Here, the manager who gives the operation instruction may be a person or an apparatus including the management apparatus 100 described above.

As described above, the manager-side cycle including Sab1, Sa2, Sa3, and Sab1, and the operator-side cycle including Sb0, Sab1, Sb2, Sb3 (Sb0), and Sab1 are integrated and function in an adaptable manner with the operation instruction (Sab1) serving as a trigger, and the quality improvement cycle starting from abnormality detection (Sb0) and following the process from the operation instruction (Sab1) to the next operation instruction (Sab1) is repeated while being improved. The manager-side cycle and the operator-side cycle functioning in an adaptable manner means that it is possible to immediately take an action in response to an abnormality in the production facility and make a recovery when the action does not go well. Accordingly, it is possible to reduce the workload of a high-cost person such as the manager, and therefore, it is possible to save costs or take more actions to maintain or improve the quality. Also, since it is possible to immediately take an action in response to an abnormality, it is possible to improve the quality and the productivity and reduce loss. The quality improvement support apparatus and the quality improvement support system according to the present invention provide the technology described above.

Embodiment 1

The following describes a management system 1 including a quality improvement support system according to Embodiment 1 of the present invention in more detail using the drawings.

(System Configuration)

FIG. 1 schematically shows a configuration example of a production facility in a surface mount production line for printed circuit boards according to the present embodiment. Surface mount technology (SMT) is technology for soldering electronic components onto the surface of printed circuit boards, and the surface mount production line includes mainly three steps, namely solder printing, components mounting, and reflow soldering (solder fusing).

As shown in FIG. 1, the surface mount production line is provided with, from upstream to downstream, a solder printing apparatus X1, a mounter X2, and a reflow furnace X3, which are production apparatuses. The solder printing apparatus X1 is an apparatus that prints solder in paste form onto electrodes (which are referred to as "lands") on printed circuit boards by using screen printing. The mounter X2 is an apparatus for picking up electronic components that are to be mounted onto circuit boards, and placing the components onto the corresponding portions of solder paste, and is also referred to as a "chip mounter". The reflow furnace X3 is a heating apparatus for heating and fusing solder paste, then cooling the solder paste, thereby soldering the electronic components onto the circuit boards. In a case where there are many electronic components to be mounted onto circuit boards or there are many types of electronic components to be mounted onto circuit boards, a plurality of mounters X2 may be provided in the surface mount production line.

The surface mount production line is provided with a system that inspects the state of a circuit board at the exit of each of the steps of solder printing, components mounting, and reflow soldering, and automatically detects a fault or the possibility of a fault. The system automatically separates non-defective products from defective products, and also has a function of providing feedback that is based on the inspection results and the analysis results thereof to the operations of each production apparatus (e.g., a function of changing a mount program).

A solder printing inspection apparatus Y1 is an apparatus for inspecting the printing state of solder paste on circuit boards conveyed from the solder printing apparatus X1. The solder printing inspection apparatus Y1 performs two-dimensional or three-dimensional measurement of solder paste printed on circuit boards, and determines whether or not each of various inspection items has a normal value (within a permissible range) based on the results of measurement. Examples of the inspection items include the volume, area, height, degree of displacement, and shape of solder. An image sensor (a camera) can be used for two-dimensional measurement of solder paste, for example, and a laser displacement meter, a phase shifting method, a space encoding method, or a light-section method can be used for three-dimensional measurement, for example.

A component inspection apparatus Y2 is an apparatus for inspecting the state of arrangement of electronic components on circuit boards conveyed from the mounter X2. The component inspection apparatus Y2 two-dimensionally or three-dimensionally measures components (or portions of components, such as the main bodies of the components, or electrodes) that are placed on solder paste, and determines whether or not each of various inspection items has a normal value (within a permissible range) based on the results of measurement. Examples of the inspection items include positional displacement and angular (rotational) displacement of the components, missing components (components are not arranged), wrong components (i.e., incorrect components are arranged), wrong polarity (i.e., the polarities of the electrodes on the components and the circuit board are incorrect), upside-down components (the components are arranged upside down), and the height of the components. Similarly to solder printing inspection, an image sensor (a camera) can be used for two-dimensional measurement of electronic components, for example, and a laser displacement meter, a phase shifting method, a space encoding method, or a light-section method can be used for three-dimensional measurement, for example.

An appearance inspection apparatus Y3 is an apparatus for inspecting the quality of soldering on circuit boards conveyed from the reflow furnace X3. The appearance inspection apparatus Y3 performs two-dimensional or three-dimensional measurement of solder portions that have been subjected to reflow soldering, and determines whether or not each of various inspection items has a normal value (within a permissible range) based on the results of measurement. Examples of the inspection items include the condition of the shape of solder fillets, in addition to the items for component inspection. For measurement of the shape of solder, a so-called color highlight method (i.e., a method in which a solder surface is irradiated with R, G, and B light rays at different incident angles, images of the reflected light rays having the respective colors are captured using a vertical camera, and thus the three-dimensional shape of solder is detected as two-dimensional hue information) may be used instead of the laser displacement meter, the phase shifting method, the space encoding method, and the light-section method described above, for example.

An X-ray inspection apparatus Y4 is an apparatus for inspecting the state of soldering on circuit boards by using an X-ray image. For example, in the case of packaged components or multi-layer circuit boards, such as a ball grid array (BGA) or a chip size package (CSP), solder joints are hidden under the components or the circuit boards, and it is impossible to inspect the state of solder by using the appearance inspection apparatus Y3 (i.e., by using an image of the external appearance). The X-ray inspection apparatus Y4 is an apparatus that complements such shortcomings of external appearance inspection. Examples of the inspection items for the X-ray inspection apparatus Y4 include positional displacement of the components, the solder height, the solder volume, the solder ball diameter, the length of back fillets, and the condition of solder joints. Note that an X-ray transmission image may be used as an X-ray image, and the use of a computed tomography (CT) image is also preferable.

(Management Apparatus)

The production apparatuses X1 to X3 and the inspection apparatuses Y1 to Y4 described above are connected to a management apparatus 100 via a network (LAN). The management apparatus 100 is constituted by a general-purpose computer system that manages and controls the production apparatuses X1 to X3 and the inspection apparatuses Y1 to Y4, and includes a CPU (a processor), a main storage device (a memory), an auxiliary storage device (a hard disk or the like), input devices (a keyboard, a mouse, a controller, a touch panel, etc.), a display device, and the like, which are not shown. Functions of the management apparatus 100, which will be described later, are realized as a result of the CPU reading and executing a program stored in the auxiliary storage device.

Note that the management apparatus 100 may be constituted by a single computer or a plurality of computers. Alternatively, all or some of the functions of the management apparatus 100 may be implemented by a computer included in any of the production apparatuses X1 to X3 and the inspection apparatuses Y1 to Y4. Alternatively, some of the functions of the management apparatus 100 may be realized by a server (for example, a cloud server) on the network.

A manager terminal 10, an operator terminal 20, and a program management server 40 are connected to the management apparatus 100 via a network (LAN). The program management server 40 manages inspection/mount programs 50. The inspection/mount programs 50 are actually programs for controlling the production apparatuses X1 to X3 and the inspection apparatuses Y1 to Y4, respectively, and are stored in a predetermined storage region of the program management server 40, downloaded into the production apparatuses X1 to X3 and the inspection apparatuses Y1 to Y4 as necessary, stored in predetermined storage regions of the respective apparatuses, and executed by the respective apparatuses.

The management apparatus 100 of the present embodiment includes functional units for realizing functions that enable the manager of a production facility to efficiently perform maintenance of the facility and quality control. FIG. 2 shows a block diagram of the functional units included in the management apparatus 100.

As shown in FIG. 2, the management apparatus 100 includes a mount information/inspection result collecting unit 111, a production information database 112, an abnormality detecting unit 113, a cause analyzing unit 114, an operation instruction creating unit 115, a management database 116, an operation instruction transmitting unit 117, a line condition data creating unit 118, an additional operation instruction issuing unit 119, an operation instruction rule editing unit 120, an operation instruction rule 121, an operation information receiving unit 122, and an operation information recording unit 123.

The mount information/inspection result collecting unit 111 collects mount information including information regarding circuit boards, solder, and components such as various electronic components, which are used in the production apparatuses X1 to X3, and information regarding various members and mechanisms of the production apparatuses X1 to X3, and also collects inspection results from the inspection apparatuses Y1 to Y4. In particular, information of cases where there is an abnormality is collected as the inspection results. Here, cases where there is an abnormality include not only cases where there is a "real fault" that is determined as a fault by any of the inspection apparatuses Y1 to Y4 and also determined as a fault through visual inspection, but also so-called "overkill" cases where a product is determined as a defective product by any of the inspection apparatuses Y1 to Y4 but is determined as a "non-defective product" through visual inspection. Note that information of an abnormality is associated with mount information regarding an apparatus member or a component in which the abnormality occurred. The inspection results also include information of errors detected in the steps performed by the production apparatuses X1 to X3. Information of such an error is also associated with mount information regarding an apparatus member or a component in which the error occurred.

The production information database 112 is a database in which the mount information and the inspection results collected by the mount information/inspection result collecting unit 111 are recorded in association with each other with respect to the same circuit board, the same component, the same date and time, or the like.

The abnormality detecting unit 113 detects an abnormality in any component on printed circuit boards based on information recorded in the production information database 112. Here, the presence or absence of an abnormality is detected based on continuous occurrence or the rate of occurrence of real faults, for example.

The cause analyzing unit 114 analyzes causes of the abnormality detected by the abnormality detecting unit 113.

The operation instruction creating unit 115 creates an operation instruction for solving the abnormality based on the operation instruction rule 121 in accordance with the causes of the abnormality found through analysis by the cause analyzing unit 114. Examples of operation instructions relating to the printing apparatus X1 include mouth cleaning, solder replenishment, and mask position change or correction. The content of operation instructions is not limited to these examples. The content of operation instructions relating to the mounter will be described later.

The operation instruction created by the operation instruction creating unit 115 is recorded in the management database 116 together with the site and conditions of the abnormality. Also, the operation instruction created by the operation instruction creating unit 115 is transmitted via the operation instruction transmitting unit 117 to at least any of the operator terminal 20, mounting/inspection apparatuses 30, and the program management server 40 in accordance with the content of the operation instruction. That is, an operation instruction directed to an operator is transmitted to the operator terminal 20, an operation instruction for controlling an apparatus is transmitted to the target apparatus included in the mounting/inspection apparatuses 30, and an operation instruction for changing a parameter in a program is transmitted to the program management server 40. Here, the production apparatuses X1 to X3 and the inspection apparatuses Y1 to Y4 are collectively referred to as the mounting/inspection apparatuses 30, and an operation instruction is actually transmitted to at least any of these apparatuses. The operation instruction may be automatically created by the operation instruction creating unit 115 or may be created based on an instruction from the manager.

Operation information regarding the operation instruction transmitted from the operation instruction transmitting unit 117 to the operator terminal 20, any of the mounting/inspection apparatuses 30, or the program management server 40 is transmitted from the operator terminal 20, the mounting/inspection apparatus 30, or the program management server 40 to the operation information receiving unit 122.

The operation corresponding to the operation instruction transmitted from the operation instruction transmitting unit 117 to the operator terminal 20, the mounting/inspection apparatus 30, or the program management server 40 is not always performed.

For example, an operator may have no time to check the operation instruction transmitted to the operator terminal 20. Also, the operator may have no time to perform the operation although the operator recognized the operation instruction received by the operator terminal 20. Also, the target of the operation instructed via the operator terminal 20 may be absent due to the produced model having been changed or replaced by changeover.

As for the operation instruction transmitted to the mounting/inspection apparatus 30, the target of the instructed operation may be absent due to the produced model having been changed or replaced by changeover. Also, there may be a case where the instructed operation cannot be performed because, when the use of a device ID is stopped, there is no alternative to it and the production will stop, or it is not desirable to stop the production line, for example. Also, the instructed operation may be rejected by a determination unit of the mounting apparatus.

As for the operation instruction transmitted to the program management server 40, the version of a mount program or component library that is the target of the instructed operation may not match the content of the instruction. Also, the mount program or component library that is the target of the instructed operation may have been locked and be unchangeable. Also, the instructed operation may be rejected by a determination unit of the program management server.

The operation information received by the operation information receiving unit 122 from the operator terminal 20, the mounting/inspection apparatus 30, or the program management server 40 is recorded in the management database 116 by the operation information recording unit 123 in association with the site of the abnormality corresponding to the operation content.

The line condition data creating unit 118 creates line condition data based on the operation instruction created by the operation instruction creating unit 115 and information recorded in the management database 116. Specifically, the line condition data constitutes a line condition data display screen (see FIG. 8) and an operation instruction issuing screen (see FIG. 11) displayed in a line condition data display unit 12 of the manager terminal 10. Although details of the content of the line condition data will be described later, the line condition data includes, as data constituting the line condition data display screen, the number of alerts (including the number of alerts for which an operation has been done) 701, latest update date and time 702, a monitoring period 703, an operation instruction status 706, information identifying the site of abnormalities (a device type, a device ID, a line, etc.), a real fault image, the number of errors (the numbers of real faults, recognition errors, and pickup errors), the number of detected production fluctuations (the number of fault signs), a latest detection time, and a monitoring period error/production fluctuation detection state. Also, the line condition data includes, as data constituting the operation instruction issuing screen, a history of operation instruction event information in the past 7 days, which includes, with respect to each operation instruction relating to a device for which an alert was issued, the date and time, the content of an operation instruction event, the status of the operation instruction, specific wording of the operation instruction, and a button for giving a renotification.

The line condition data created by the line condition data creating unit 118 is transmitted to the manager terminal 10 and displayed. When an additional operation instruction is selected by the manager terminal 10, an additional operation instruction is issued by the additional operation instruction issuing unit 119 and an additional operation instruction is created by the operation instruction creating unit 115. The additional operation instruction includes the same operation instruction as that already given and an operation instruction newly created by the manager. When modification of the operation instruction rule is selected by the manager terminal 10, the operation instruction rule 121 is edited by the operation instruction rule editing unit 120. The additional operation instruction may be issued by the additional operation instruction issuing unit 119 in response to an instruction received from the manager via the manager terminal 10 or may be automatically issued by the additional operation instruction issuing unit 119.

(Manager Terminal)

Figure 3:
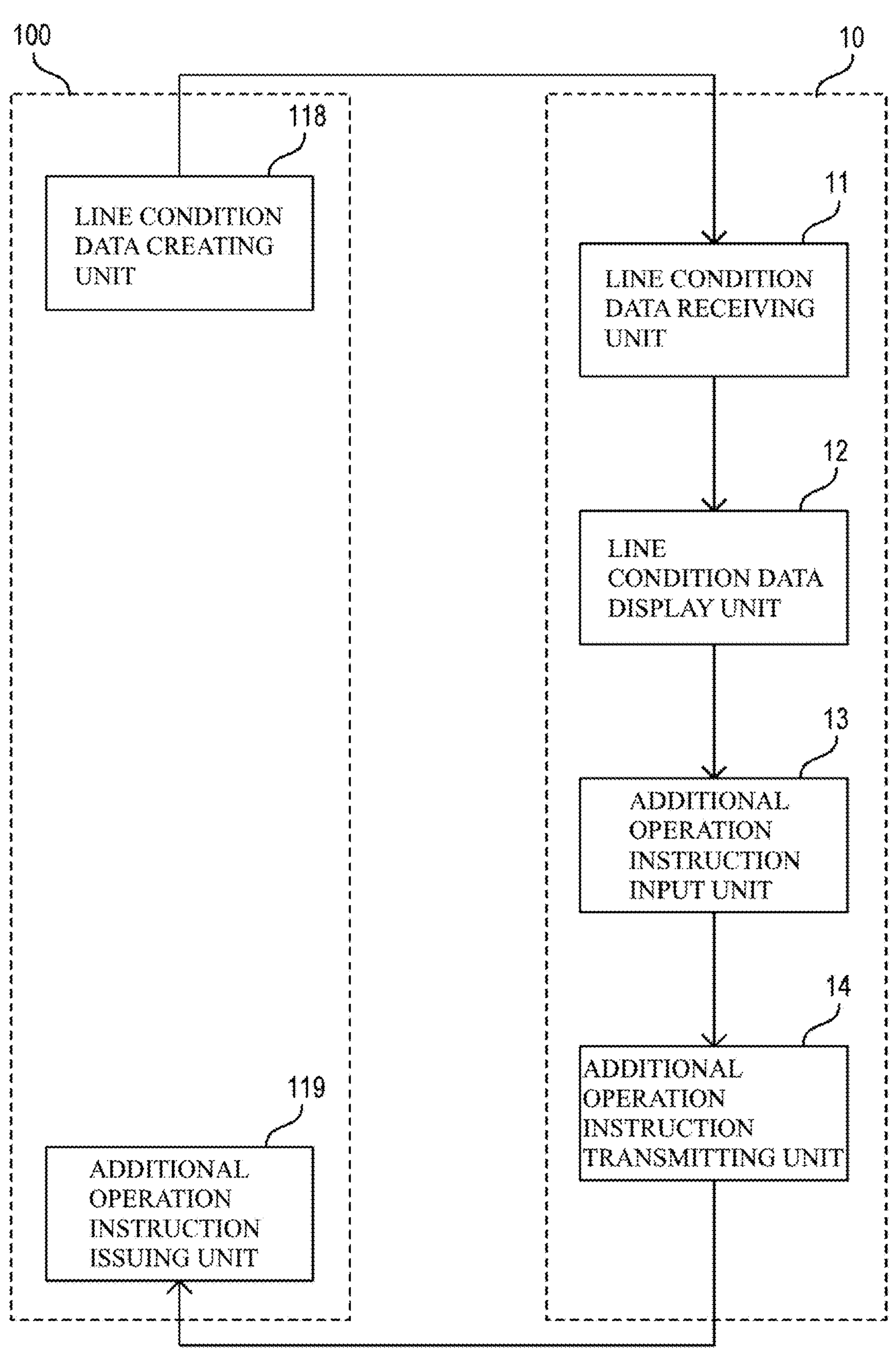
FIG. 3 is a functional block diagram of a manager terminal according to an embodiment of the present invention.

As shown in FIG. 3, the manager terminal 10 includes a line condition data receiving unit 11, a line condition data display unit 12, an additional operation instruction input unit 13, and an additional operation instruction transmitting unit 14. The manager terminal 10 is constituted by a general-purpose computer system that includes a CPU (a processor), a main storage device (a memory), an auxiliary storage device (a hard disk or the like), input devices (a keyboard, a mouse, a controller, a touch panel, etc.), a display device, and the like. The functional units of the manager terminal 10 described above are realized as a result of the CPU reading and executing a program stored in the auxiliary storage device.

The line condition data receiving unit 11 receives the line condition data created by the line condition data creating unit 118 of the management apparatus 100.

The line condition data display unit 12 displays the line condition data received by the line condition data receiving unit 11. Specifically, the line condition data display unit 12 is constituted by a display device such as a display, and may also serve as an input device like a touch panel display.

An additional operation instruction to be issued in addition to an already-issued operation instruction is input via the additional operation instruction input unit 13. Specifically, the additional operation instruction input unit 13 is constituted by an input device via which an additional operation is input in accordance with information displayed in the display device, and may also serve as the display device like a touch panel display.

The additional operation instruction input via the additional operation instruction input unit 13 is transmitted from the additional operation instruction transmitting unit 14 to the additional operation instruction issuing unit 119 of the management apparatus 100.

(Operator Terminal)

Here, an instruction to perform an operation is given to an operator via the operator terminal 20, and the operator executes the operation.

Figure 4:
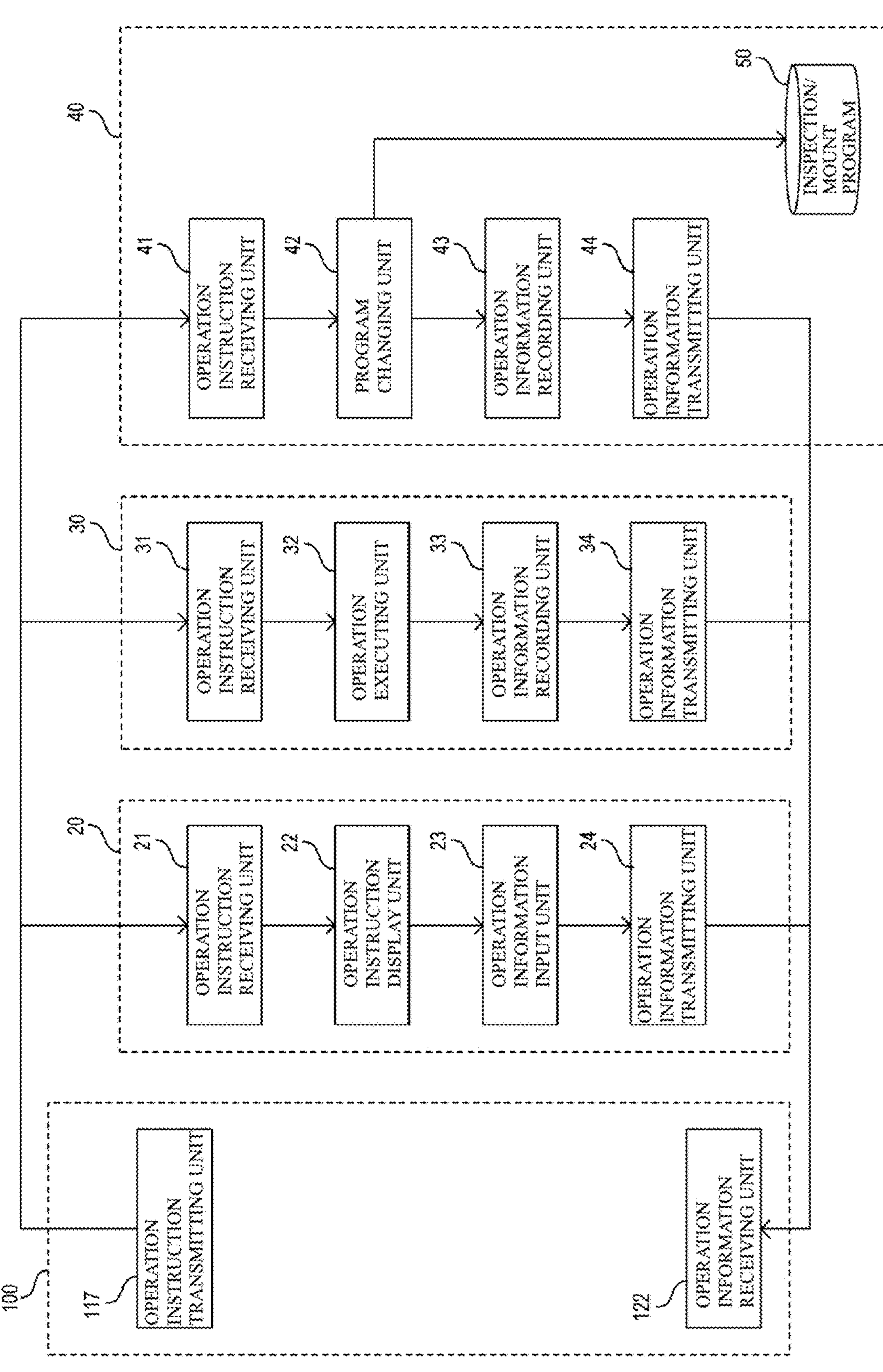
FIG. 4 is a functional block diagram of an operator terminal, a mounting/inspection apparatus, and a program management server according to an embodiment of the present invention.

As shown in FIG. 4, the operator terminal 20 includes an operation instruction receiving unit 21, an operation instruction display unit 22, an operation information input unit 23, and an operation information transmitting unit 24. Specifically, the operator terminal 20 corresponds to various apparatuses such as an inspection program creating terminal, a mount program creating terminal, a maintenance operation terminal, or a line management terminal according to the operator and the operation content. Such an operator terminal 20 may be constituted by a general-purpose computer system that includes a CPU (a processor), a main storage device (a memory), an auxiliary storage device (a hard disk or the like), input devices (a keyboard, a mouse, a controller, a touch panel, etc.), a display device, and the like. Alternatively, all or some of the functions of the operator terminal 20 may be implemented by a computer included in any of the production apparatuses X1 to X3 and the inspection apparatuses Y1 to Y4.

The operation instruction receiving unit 21 receives an operation instruction transmitted from the operation instruction transmitting unit 117 of the management apparatus 100.

The operation instruction display unit 22 displays the operation instruction received by the operation instruction receiving unit 21. Specifically, the operation instruction display unit 22 is constituted by a display device such as a display, and may also serve as an input device like a touch panel display. Here, the operation instruction display unit 22 corresponds to an instruction content display unit in the present invention.

Operation information corresponding to the operation instruction is input via the operation information input unit 23. Specifically, the operation information input unit 23 is constituted by an input device that enables input of operation information corresponding to an operation instruction displayed in the display device, and may also serve as the display device like a touch panel display. Here, the operation information input unit 23 corresponds to an operation instruction state information obtaining unit in the present invention. The operation information is input by a user of the operator terminal 20. The user may be the operator. Alternatively, a person other than the operator may input the operation information with use of the operator terminal 20.

The operation information input via the operation information input unit 23 is transmitted from the operation information transmitting unit 24 to the operation information receiving unit 122 of the management apparatus 100. Here, the operation information transmitting unit 24 corresponds to an operation instruction state information transmitting unit in the present invention.

(Mounting/Inspection Apparatus)

Here, a mounting/inspection apparatus 30 automatically executes an instructed operation.

As shown in FIG. 4, the mounting/inspection apparatus 30 includes an operation instruction receiving unit 31, an operation executing unit 32, an operation information recording unit 33, and an operation information transmitting unit 34. As described above, the mounting/inspection apparatus 30 is a generic term for the production apparatuses X1 to X3 and the inspection apparatuses Y1 to Y4 and actually corresponds to at least any of these apparatuses in accordance with the content of the operation instruction. Here, the mounting/inspection apparatus 30 corresponds to the operation instruction receiving apparatus in the present invention.

The operation instruction receiving unit 31 receives an operation instruction transmitted from the operation instruction transmitting unit 117 of the management apparatus 100.

The operation executing unit 32 executes the instructed operation on a member or a mechanism constituting the target apparatus based on the operation instruction received by the operation instruction receiving unit 31.

The operation information recording unit 33 records operation information regarding the operation executed by the operation executing unit 32. Here, the operation information recording unit 33 corresponds to the operation instruction state information obtaining unit in the present invention.

The operation information recorded by the operation information recording unit 33 is transmitted from the operation information transmitting unit 34 to the operation information receiving unit 122 of the management apparatus 100. The operation information transmitting unit 34 corresponds to the operation instruction state information transmitting unit in the present invention.

(Program Management Server)

Here, the program management server 40 automatically executes an instructed operation.

As shown in FIG. 4, the program management server 40 includes an operation instruction receiving unit 41, a program changing unit 42, an operation information recording unit 43, and an operation information transmitting unit 44. Here, the program management server 40 corresponds to the operation instruction receiving apparatus in the present invention.

The operation instruction receiving unit 41 receives an operation instruction transmitted from the operation instruction transmitting unit 117 of the management apparatus 100.

The program changing unit 42 changes an inspection/mount program 50 based on the operation instruction received by the operation instruction receiving unit.

The operation information recording unit 43 records operation information regarding the state of change made in the program by the program changing unit 42. Here, the operation information recording unit 43 corresponds to the operation instruction state information obtaining unit in the present invention.

The operation information recorded by the operation information recording unit 43 is transmitted from the operation information transmitting unit 44 to the operation information receiving unit 122 of the management apparatus 100. Here, the operation information transmitting unit 44 corresponds to the operation instruction state information transmitting unit in the present invention.

(Mounter)

The following describes operations of the functional units of the management apparatus 100, the manager terminal 10, and the operator terminal 20 in detail using an example of the mounter X2.

Figure 5:
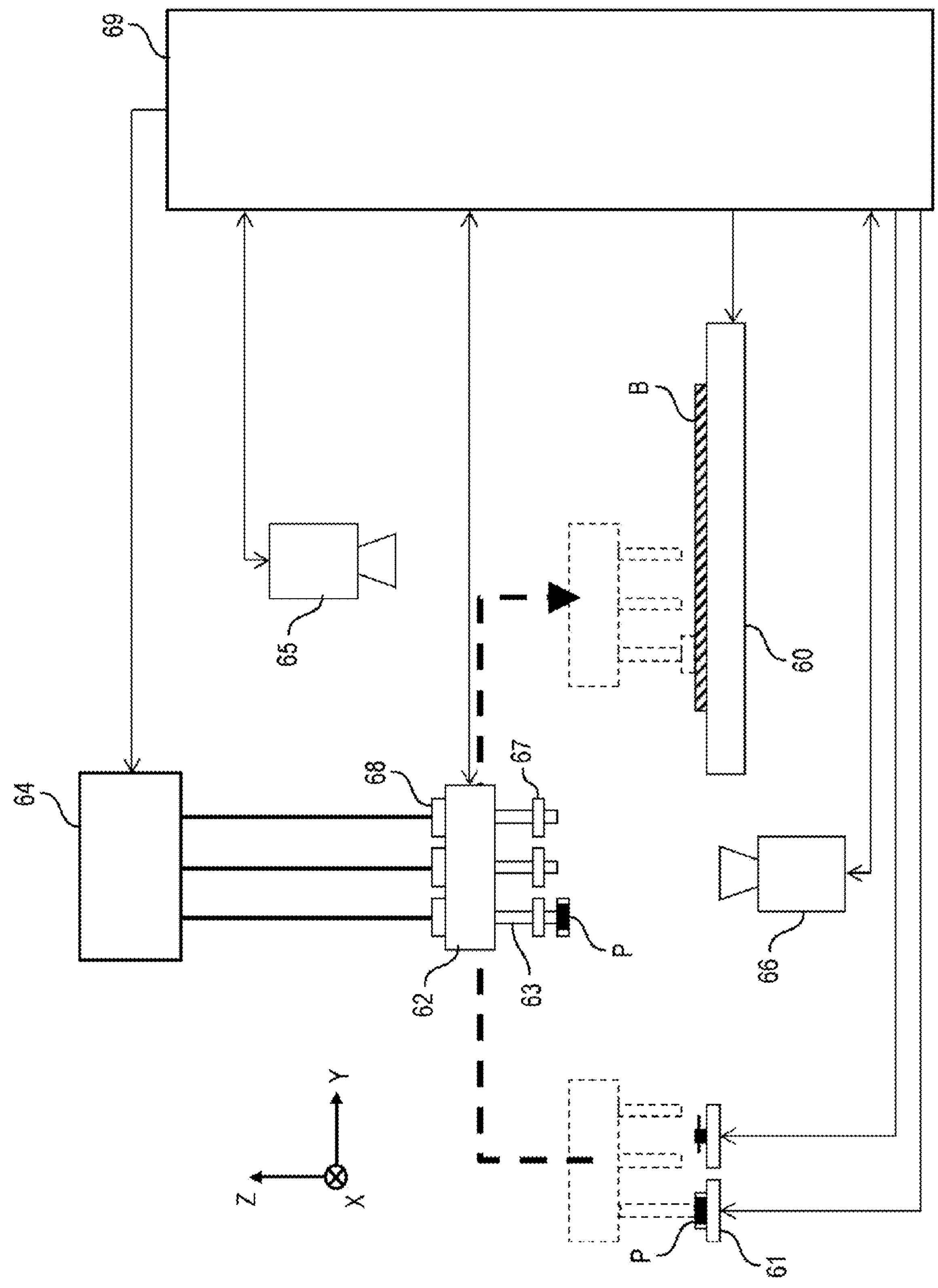
FIG. 5 is a schematic diagram showing a configuration of a mounter according to an embodiment of the present invention.

FIG. 5 is a diagram schematically showing the configuration of the mounter X2. The mounter X2 includes a stage 60 for placing a circuit board B, a plurality of feeders 61 that supply electronic components P, a movable head 62 that picks up the electronic components P, a plurality of nozzles 63 attached to the head 62, and a vacuum pump 64 that controls air pressures of the respective nozzles, for example. Electronic components P having different component numbers are set on the feeders 61 in respective rows. Also, the mounter X2 includes, as an observation system for detecting an abnormality in the operations of the mounter X2, an upper camera 65, a lower camera 66, a contact sensor 67 for measuring contact pressures at end surfaces of the nozzles, and a pressure sensor 68 for measuring air pressures of the nozzles, for example. A control unit 69 is a block that controls each part of the mounter X2 and performs computation and information processing, and includes a CPU (a processor) and a memory, for example. The mounter X2 may also include an output device for outputting information. As for the coordinate system, the X axis and the Y axis are parallel to a circuit board surface, and the Z is perpendicular to the circuit board surface.

When a circuit board B is conveyed to the stage 60, the control unit 69 controls each nozzle 63 following the mount program to pick up and convey necessary electronic components P from the feeders 61 and sequentially arrange the electronic components P on the circuit board B. When all the electronic components P are arranged (mounted), the circuit board B is conveyed to a downstream step (the inspection apparatus Y2). Also, production log information including production abnormality information is recorded as production information regarding the circuit board B in the memory of the mounter X2. A circuit board ID, component numbers of the components, a circuit number, and information (nozzle IDs and feeder IDs) indicating apparatus members used to process the components are associated with each other in the production log information.

FIG. 6 shows an example of the production log information recorded in the mounter X2. Each row corresponds to a production record of a component and includes information such as a circuit board ID, a component number, a circuit number, a nozzle ID, a feeder ID, and production abnormality information (the number of image recognition processing errors and the number of component pickup errors). It is possible to know apparatus members used to produce a component on a circuit board by referring to the production log information.

FIG. 7 is a functional block diagram of the management apparatus 100 clarifying a configuration relating to the mounter X2. Functional blocks that are common to the functional block diagram shown in FIG. 2 are denoted by the same reference signs as those used in FIG. 2, and a detailed description thereof is omitted. Here, an inspection/mount program 50*m* is a program relating to the mounter X2 out of the inspection/mount programs 50.

The mount information/inspection result collecting unit 111 collects information regarding components such as various electronic components, circuit boards, and solder used in the production line and information regarding various members and mechanisms constituting the production apparatuses such as the mounter X2, and also collects the production log information (production abnormality information included therein) described above from the mounter X2 and information of inspection results (in particular, information of real faults and overkill) about circuit boards after mounting from the post-mount inspection apparatus Y2. These pieces of information may be collected at suitable timings. For example, these pieces of information may be obtained at a point in time determined in advance or at a frequency determined in advance, or in response to a request from a user. Information regarding components can be collected when a new component is introduced into the production line, or a component having the same component number as those already used but produced in a different production lot is introduced into the production line, for example. Information regarding various members and mechanisms can be collected at the time of replacement or maintenance of an apparatus member, or introduction of a new apparatus member into the production line, for example. The production log information can be transmitted from the control unit 69 of the mounter X2 to the management apparatus 100 every time mounting of components on a circuit board is completed by the mounter X2, for example. Information of inspection results can be collected every time inspection of a circuit board is completed by the post-mount inspection apparatus Y2, for example.

The abnormality detecting unit 113 detects an abnormality such as an error in the production of a component or a fault found in the inspection from information collected by the mount information/inspection result collecting unit 111 and recorded in the production information database 112.

The cause analyzing unit analyzes causes of the abnormality detected by the abnormality detecting unit 113, and extracts an apparatus member, a component number, or a parameter in a program that is presumed to be the cause of the abnormality. There is no particular limitation on the timing and method for analyzing causes, but the causes may be analyzed in every predetermined totaling period based on comparison between the number of abnormalities detected for each apparatus member or component number and a normal value or comparison between numbers of abnormalities detected for different members of the same type or different component numbers, for example.

The operation instruction creating unit 115 creates an operation instruction based on the cause of the abnormality analyzed by the cause analyzing unit 114 and the operation instruction rule 121 prescribed in advance to solve abnormalities in accordance with causes of the abnormalities.

The following describes examples of operation instructions. Examples of operation instructions for the mounter X2 include an instruction to stop the use of a specific nozzle or feeder. Examples of operation instructions for the program management server 40 include: instructions relating to the mounter X2 such as an instruction to change or correct the mount coordinates and an instruction to change the size of a component or a permissible range; and instructions relating to the post-mount inspection apparatus Y2 such as an instruction to change inspection standards. Examples of operation instructions given to the operator via the operator terminal 20 include an instruction to replace a nozzle, a feeder, or the head, an instruction to perform maintenance thereof, and an instruction to perform an operation that cannot be automatically performed by the mounter X2 or the post-mount inspection apparatus Y2. The content of operation instructions is not limited to these examples.

The line condition data created based on the operation instruction created by the operation instruction creating unit 115 and the information recorded in the management database 116 is transmitted from the line condition data creating unit 118 to the manager terminal 10 and displayed in the line condition data display unit 12.

(Screen for Manager (Line Condition Data Display Screen))

Figure 8:
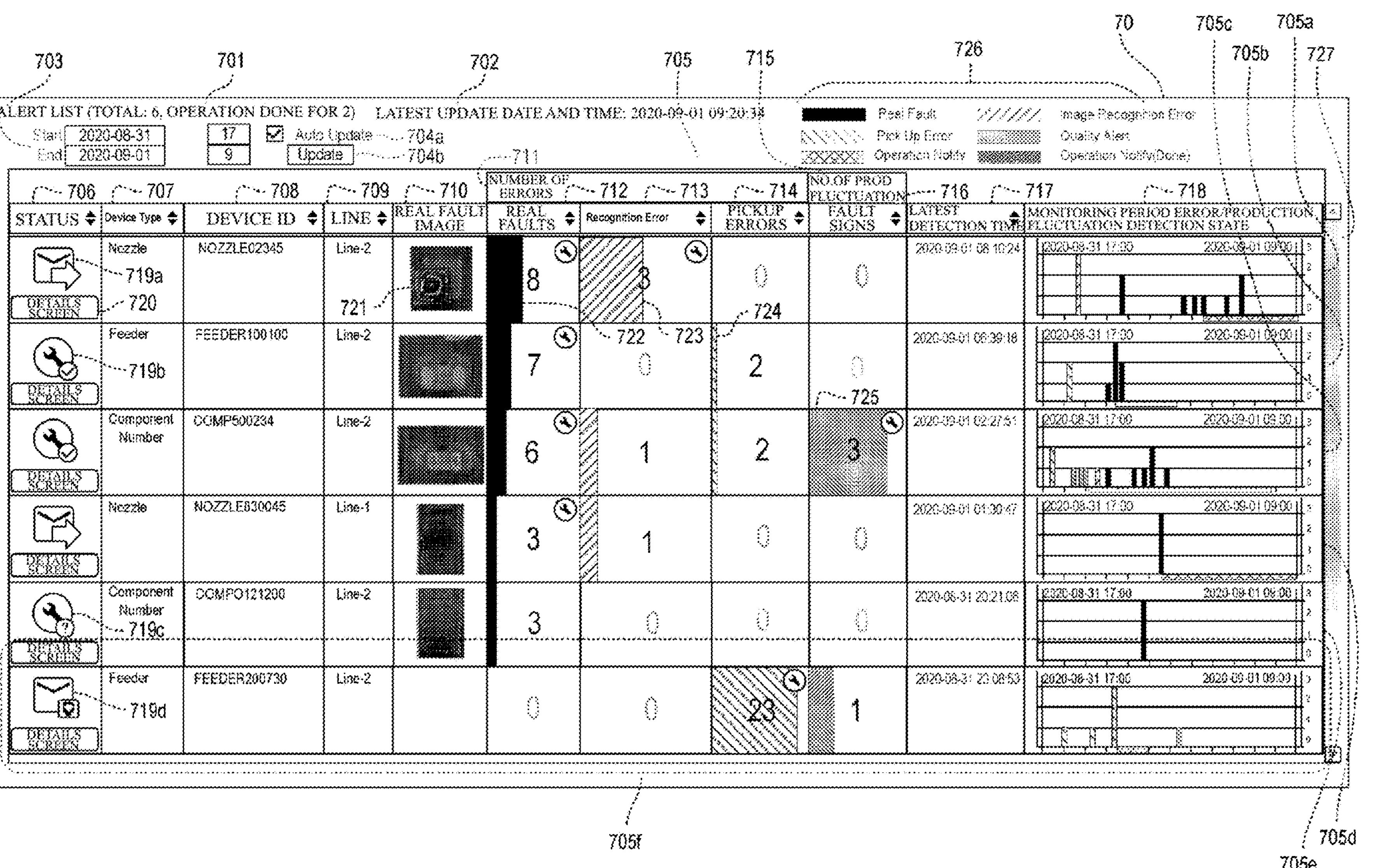
FIG. 8 is a diagram showing an example of a line condition data display screen in the manager terminal according to an embodiment of the present invention.

FIG. 8 shows an example of the line condition data display screen 70 displayed in the line condition data display unit 12 of the manager terminal 10. In FIG. 8, leader lines associated with reference numerals are drawn as broken lines to distinguish them from lines displayed in the screen.

A title/number of alerts 701 including a title "ALERT LIST" indicating the display content, the total number of alerts (6), and the number of alerts (2) for which an operation has been done is displayed like "ALERT LIST (TOTAL: 6, OPERATION DONE FOR 2)" in an upper left region of the line condition data display screen 70. This makes it possible to easily recognize the number of alerts and the number of alerts for which an operation has been done. On the right of the title/number of alerts 701, a latest update date and time 702 of data displayed in the "ALERT LIST" is displayed as "2020-09-01 09:20:34". Also, a monitoring period 703 including the start (2020-08-31 17:00) and the end (2020-09-01 9:00) is displayed indicating a data collection period for which the data displayed in the "ALERT LIST" was collected. Here, a checkbox 704*a* associated with Auto Update for automatically updating the collection period of data displayed in the "ALERT LIST" is checked, and a setting for automatically updating the data collection period is applied. The start and the end of the data collection period may be specified by the user. Also, the user can manually update the data collection period by clicking or touching an Update button 704*b*. Here, the monitoring period 703, which is the data collection period, corresponds to a predetermined period in the present invention.

An alert list 705 is displayed as a table in the line condition data display screen 70. In the alert list 705, information relating to an alert is collectively displayed in a row, like individual alert related information pieces 705*a* to 705*f*. Names of information items constituting the individual alert related information pieces 705*a* to 705*f*, which are each collectively displayed in a row, are displayed in respective columns at the table header row. Here, each of the individual alert related information pieces 705*a* to 705*f* includes, as the information items, a status 706, a device type 707, a device ID 708, a line 709, a real fault image 710, the number of errors 711 including the numbers of real faults 712, recognition errors 713, and pickup errors 714, fault signs 716 indicating the number of detected production fluctuations 715, a latest detection time 717, and a monitoring period error/production fluctuation detection state 718.

In the line condition data display screen 70, icons 719 (icons 719*a* to 719*e* indicating status will be collectively referred to as "icons 719") indicating the status of operation instructions corresponding to respective alerts are displayed in the column of the status 706, and details screen display buttons 720 for displaying a details screen, which will be described later, are also displayed together with the icons 719 in this column. FIG. 9 shows the icons 719, the content and states indicated by the icons 719, and actions to be taken by the manager in accordance with the status indicated by the icons 719.

An icon 719*a* in the first row of the table shown in FIG. 9 indicates that "an operation instruction notification was given (currently displayed)", which means that the status of the latest operation instruction for an improvement target, which is presumed to be the cause of an abnormality through analysis, is "not done". Accordingly, conceivable actions to be taken by the manager when this icon 719*a* is displayed include waiting for the instructed operation to be performed or instructing the operator to perform the operation.

An icon 719*b* in the second row of the table shown in FIG. 9 indicates that "an improvement operation has been done", which means that the status of the latest operation instruction for the improvement target is "done". Accordingly, conceivable actions to be taken by the manager when this icon 719*b* is displayed include confirming effects of the performed operation.

An icon 719*c* in the third row of the table shown in FIG. 9 indicates that "an improvement operation has not been assigned", which means that the status of the latest operation instruction for the improvement target is "not assigned". Accordingly, conceivable actions to be taken by the manager when this icon 719*c* is displayed include examining the content of the operation instruction and giving the operation instruction to an operator.

An icon 719*d* in the fourth row of the table shown in FIG. 9 indicates that "the number of notifications has exceeded the maximum number of simultaneous notifications (display was ended)", which means that the status of the latest operation instruction for the improvement target is "exceeding the maximum number of simultaneous notifications". Accordingly, conceivable actions to be taken by the manager when this icon 719*d* is displayed include reissuing the same operation instruction because display of the operation instruction was ended without the instructed operation being performed.

An icon 719*e* in the fifth row of the table shown in FIG. 9 (this icon is not shown in FIG. 8, but is denoted by the reference sign to be distinguished from the other icons) indicates "waiting for the improvement operation instruction to be obtained", which means that the status of the latest operation instruction for the improvement target is "waiting for a request to obtain". Accordingly, conceivable actions to be taken by the manager when this icon 719*e* is displayed include confirming whether or not a setting for receiving notifications of operation instructions is applied in an operation instruction application installed in the operator terminal 20 or the like, which is the receiver of the operation instruction.

As described above, the manager can check whether or not there is an action to be taken and determine the next action as necessary based on the icons 719 displayed in the column of the status 706 in the alert list 705 in the line condition data display screen 70.

In the column of the device type 707 in the alert list 705 displayed in the line condition data display screen 70, types of apparatus members and components, which are improvement targets, are displayed. In the case of the mounter X2, Nozzle, Header, Feeder, and Component Number are displayed as the types. Icons representing the types may also be displayed together with these names.

In the column of the device ID 708 in the alert list 705 displayed in the line condition data display screen 70, device IDs for identifying production members and components, which are improvement targets, are displayed like "NOZZLE200340".

In the column of the line 709 in the alert list 705 displayed in the line condition data display screen 70, names of lines, which are improvement targets, are displayed like "Line-1" and "Line-2".

In the column of the real fault image 710 in the alert list 705 displayed in the line condition data display screen 70, images 721 of improvement targets with real faults, which are captured by the inspection apparatus Y3, are displayed in cases where real faults occurred.

The number of errors 711 in the alert list 705 displayed in the line condition data display screen 70 is composed of three items: real faults 712, recognition errors 713, and pickup errors 714, and the numbers of errors corresponding to these items are displayed as figures. Furthermore, in the regions where the numbers of errors are displayed, bars expressing relative rates with their widths from the left end of the regions are displayed so as to overlap the regions to make it possible to visually recognize relative rates of the numbers of errors for each alert. In the drawing, bars 722 showing the number of real faults are filled in black, bars 723 showing the number of recognition errors are hatched with lines extending diagonally up to the right, and bars 724 showing the number of pickup errors are hatched with lines extending diagonally up to the left to distinguish the numbers of errors corresponding to the respective items, but actually, it is also possible to distinguish the numbers of errors corresponding to the respective items using different colors. Also, if 0 and figures other than 0 are displayed with different degrees of brightness or in different colors, it is possible to more clearly recognize the presence or absence of an error. This also applies to the number of detected production fluctuations, which will be described later.

The number of fault signs 716 is displayed in the column of the number of detected production fluctuations 715 in the alert list 705 displayed in the line condition data display screen 70. There is no particular limitation on the method for detecting fault signs. For example, when an average value of process capability indexes of a predetermined number of successively-processed circuit boards is lower than a predetermined threshold, it may be determined that there is a fault sign, and the number of such fault signs may be detected as the number of fault sights 716. Here, as is the case with the number of errors 711, in the regions where the numbers of fault signs are displayed, bars 725 expressing relative rates of the numbers of fault signs with their widths from the left end of the regions are displayed so as to overlap the regions to make it possible to visually recognize relative rates of the numbers of fault signs for each alert. The bars 725 showing the numbers of fault signs are hatched differently from the bars 722 showing the number of real faults, and the like, but it is also possible to display the bars 725 in a different color from the bars 722 and the like. It is also possible to use an index other than the fault signs 716 for the number of detected production fluctuations 715.

In the column of the latest detection time 717 in the alert list 705 displayed in the line condition data display screen 70, the latest detection time, which is the end of the period for which data displayed in the alert list 705 was collected, is displayed like "2020-09-0108:10:24".

Figures 10A, 10B:
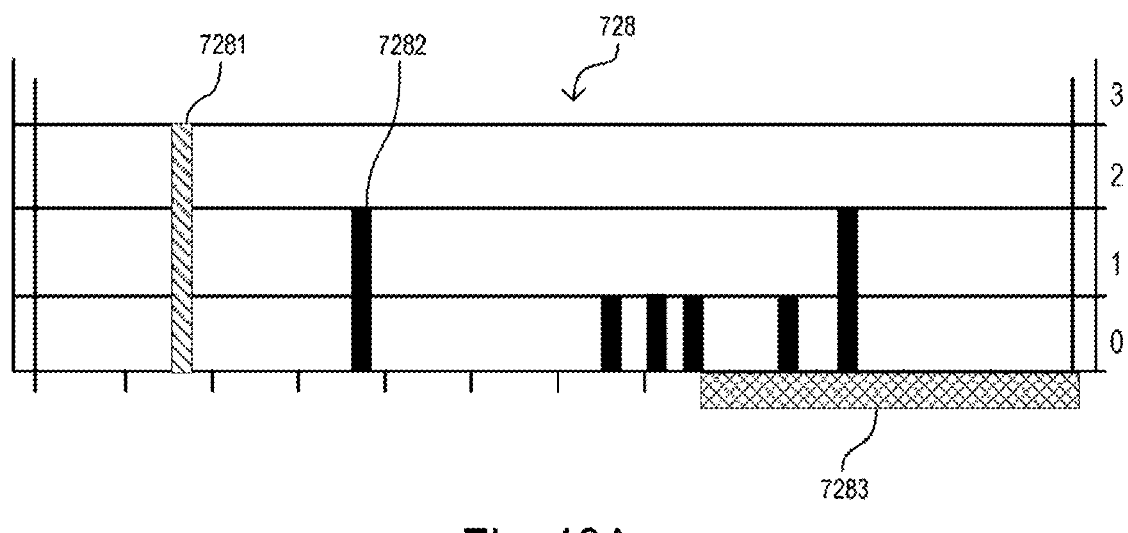
FIGS. 10A and 10B show graphs showing monitoring period error/production fluctuation detection states according to an embodiment of the present invention.

In the column of the monitoring period error/production fluctuation detection state 718 in the alert list 705 displayed in the line condition data display screen 70, a graph that shows changes in the number of errors and the number of detected production fluctuations during the monitoring period in time series is displayed for each alert. The horizontal axis of the graph shows the monitoring period, and the vertical axis of the graph shows the number of errors and the number of detected production fluctuations. In this graph, bars respectively corresponding to the real faults 712, the recognition errors 713, the pickup errors 714, and the fault signs 716 are distinguished by being displayed in the same manner as the bars 722 and the like corresponding to these items. That is, in the graph of the monitoring period error/production fluctuation detection state 718 as well, bars showing the number of real faults are filled in black, bars showing the number of recognition errors are hatched with lines extending diagonally up to the right, bars showing the number of pickup errors are hatched with lines extending diagonally up to the left, and bars showing the number of fault signs are filled in grey. The graph of the monitoring period error/production fluctuation detection state 718 includes, in addition to these bars representing the respective items, for example, a band-shaped region 7283 (see FIG. 10) extending along the horizontal axis and indicating that an operation instruction notification was given and the instructed operation was performed. That is, cross-hatched band-shaped regions 7283 indicating that operation instruction notifications were given are displayed in time series along the horizontal axis so as to overlap the graphs of the monitoring period error/production fluctuation detection state in the first, fourth, and sixth rows. Also, dotted band-shaped regions 7295 (see FIG. 10) indicating that operations corresponding to given operation instruction notifications were performed are displayed in time series along the horizontal axis so as to overlap the graphs of the monitoring period error/production fluctuation detection state in the second and third rows. Actually, it is also possible to display these band-shaped regions 7283 and 7295 in colors different from each other. Here, the graph showing changes in the number of errors and the number of detected production fluctuations during the monitoring period in time series (for example, graphs 728 and 729 described later) for each alert in the column of the monitoring period error/production fluctuation detection state 718 and having the horizontal axis showing the monitoring period and the vertical axis showing the number of errors and the number of detected production fluctuations corresponds to chronological condition information in the present invention.

A legend 726 is displayed in the upper portion of the line condition data display screen 70 to show correspondence between the manners of display of the bars 722 and the like and the items and correspondence between the manners of display of the band-shaped region 7283 and the like and their meanings.

Also, a scroll bar 727 is displayed at the right end of the alert list 705 in the line condition data display screen 70. When the number of alerts is more than the number of information pieces displayed in the line condition data display screen 70, it is possible to display individual alert related information that is not displayed in the line condition data display screen 70 by moving the scroll bar 727.

In the first row of the alert list 705 showing the individual alert related information 705*a*, the icon 719*a* indicating that an operation instruction notification was given (currently displayed) is displayed in the column of the status 706. In this row, Nozzle is displayed in the column of the device type 707, NOZZLE02345 is displayed in the column of the device ID 708, and Line-2 is displayed in the column of the line 709. Also, 8, 3, and 0 are respectively displayed in the columns of the real faults 712, the recognition errors 713, and the pickup errors 714 corresponding to the number of errors 711, and bars 722 and 723 respectively showing the number of real faults and the number of recognition errors are also displayed in the columns of the real faults 712 and the recognition errors 713. Also, 0 is displayed in the column of the fault signs 716 corresponding to the number of detected production fluctuations 715. Also, "2020-09-01 08:10:24" is displayed in the column of the latest detection time 717. The graph displayed in the column of the monitoring period error/production fluctuation detection state 718 is enlarged in FIG. 10A. This graph 728 of the monitoring period error/production fluctuation detection state shows the number of errors and the number of detected production fluctuations during the collection period (monitoring period) of line condition data from 17:00 on Aug. 31, 2020 to 9:00 on Sep. 1, 2020 in time series. Specifically, first, three recognition errors 7281 were detected, and thereafter two real faults 7282, one real fault 7282, one real fault 7282, and one real fault 7282 were detected in time series. At this stage, an operation instruction notification was given, but the operation was not performed, and thereafter, one real fault and two real faults were detected. In the graph shown in FIG. 10A, the recognition errors 7281 and the real faults 7282 are displayed in different display manners, and therefore, the manager can recognize the number of errors of each type and the number of detected production fluctuations in time series. Also, the cross-hatched band-shaped region 7283 displayed along the horizontal axis in the graph shown in FIG. 10A enables the manager to recognize the timing at which the operation instruction was given and the fact that the instructed operation has not been performed. As described above, the graph displayed in the column of the monitoring period error/production fluctuation detection state 718 in the line condition data display screen 70 enables the manager to easily recognize the number of errors of each type and the number of production fluctuations in time series, the presence or absence of an operation instruction, and in the case where an operation instruction was given, the timing at which the operation instruction was given and whether or not the instructed operation has been performed.

In the second row of the alert list 705 showing the individual alert related information 705*b*, the icon 719*b* indicating that an improvement operation has been performed is displayed in the column of the status 706. In this row, Feeder is displayed in the column of the device type 707, FEEDER100100 is displayed in the column of the device ID 708, and Line-2 is displayed in the column of the line 709. Also, 7, 0, and 2 are respectively displayed in the columns of the real faults 712, the recognition errors 713, and the pickup errors 714 corresponding to the number of errors 711, and bars 722 and 724 respectively showing the number of real faults and the number of pickup errors are also displayed in the columns of the real faults 712 and the pickup errors 714. Also, 0 is displayed in the column of the fault signs 716 corresponding to the number of detected production fluctuations 715. Also, "2020-09-01 06:39:18" is displayed in the column of the latest detection time 717. In the column of the monitoring period error/production fluctuation detection state 718, a graph of the monitoring period error/production fluctuation detection state is displayed showing the number of errors and the number of detected production fluctuations during the period from 17:00 on Aug. 31, 2020 to 9:00 on Sep. 1, 2020 in time series. This graph of the monitoring period error/production fluctuation detection state shows that two pickup errors, one real fault, and three real faults were detected in time series, and after the three real faults were detected, an operation instruction notification was given and the instructed operation was performed, and then two real faults were detected, but thereafter no error and no production fluctuation were detected.

In the third row of the alert list 705 showing the individual alert related information 705*c*, the icon 719*b* indicating that an improvement operation has been performed is displayed in the column of the status 706. In this row, Component Number is displayed in the column of the device type 707, COMP500234 is displayed in the column of the device ID 708, and Line-2 is displayed in the column of the line 709. Also, 6, 1, and 2 are respectively displayed in the columns of the real faults 712, the recognition errors 713, and the pickup errors 714 corresponding to the number of errors 711, and bars 722, 723, and 724 respectively showing the number of real faults, the number of recognition errors, and the number of pickup errors are also displayed in the columns of the real faults 712, the recognition errors, 713, and the pickup errors 714. Also, 3 and a bar 725 showing the number of fault signs are displayed in the column of the fault signs 716 corresponding to the number of detected production fluctuations 715. Also, "2020-09-01 02:27:51" is displayed in the column of the latest detection time 717. The graph displayed in the column of the monitoring period error/production fluctuation detection state 718 is enlarged in FIG. 10B. In this graph 729 of the monitoring period error/production fluctuation detection state, the number of errors and the number of detected production fluctuations during the period from 17:00 on Aug. 31, 2020 to 9:00 on Sep. 1, 2020 are displayed in time series. Specifically, first, two pickup errors 7291 were detected, and thereafter, one fault sign 7292, one fault sign 7292, and one fault sign 7292 were detected in time series. At this stage, an operation instruction notification was given and the instructed operation was performed. Thereafter, one recognition error 7293, one real fault 7294, one real fault 7294, one real fault 7294, two real faults 7294, and one real fault 7294 were detected. In the graph shown in FIG. 10B, the pickup errors 7291, the fault signs 7292, the recognition error 7293, and the real faults 7294 are displayed in different display manners, and therefore, the manager can recognize the number of errors of each type and the number of detected production fluctuations in time series. Also, the dotted band-shaped region 7295 displayed along the horizontal axis in the graph shown in FIG. 10B enables the manager to recognize the timing at which the operation instruction was given and the fact that the instructed operation was performed.

In the fourth row of the alert list 705 showing the individual alert related information 705*d*, the icon 719*a* indicating that an operation instruction notification was given (currently displayed) is displayed in the column of the status 706. In this row, Nozzle is displayed in the column of the device type 707, NOZZLE830045 is displayed in the column of the device ID 708, and Line-1 is displayed in the column of the line 709. Also, 3, 1, and 0 are respectively displayed in the columns of the real faults 712, the recognition errors 713, and the pickup errors 714 corresponding to the number of errors 711, and bars 722 and 723 respectively showing the number of real faults and the number of recognition errors are also displayed in the columns of the real faults 712 and the recognition errors 713. Also, 0 is displayed in the column of the fault signs 716 corresponding to the number of detected production fluctuations 715. Also, “2020-09-01 01:30:47” is displayed in the column of the latest detection time 717. In the column of the monitoring period error/production fluctuation detection state 718, a graph of the monitoring period error/production fluctuation detection state is displayed showing the number of errors and the number of detected production fluctuations during the period from 17:00 on Aug. 31, 2020 to 9:00 on Sep. 1, 2020 in time series. This graph of the monitoring period error/production fluctuation detection state shows that three real faults were detected, an operation instruction notification was given after the three real faults were detected, the instructed operation has not been performed, but only one recognition error was detected after that.

In the fifth row of the alert list 705 showing the individual alert related information 705*e*, the icon 719*c* indicating that an improvement operation has not been assigned is displayed in the column of the status 706. In this row, Component Number is displayed in the column of the device type 707, COMP121200 is displayed in the column of the device ID 708, and Line-2 is displayed in the column of the line 709. Also, 3, 0, and 0 are respectively displayed in the columns of the real faults 712, the recognition errors 713, and the pickup errors 714 corresponding to the number of errors 711, and a bar 722 showing the number of real faults is also displayed in the column of the real faults 712. Also, 0 is displayed in the column of the fault signs 716 corresponding to the number of detected production fluctuations 715. Also, “2020-08-31 20:21:06” is displayed in the column of the latest detection time 717. In the column of the monitoring period error/production fluctuation detection state 718, a graph of the monitoring period error/production fluctuation detection state is displayed showing the number of errors and the number of detected production fluctuations during the period from 17:00 on Aug. 31, 2020 to 9:00 on Sep. 1, 2020 in time series. This graph of the monitoring period error/production fluctuation detection state shows that three real faults were detected and no operation instruction notification was given.

In the sixth row of the alert list 705 showing the individual alert related information 705*f*, the icon 719*d* indicating that the number of notifications has exceeded the maximum number of simultaneous notifications (display was ended) is displayed in the column of the status 706. In this row, Feeder is displayed in the column of the device type 707, FEEDER200730 is displayed in the column of the device ID 708, and Line-2 is displayed in the column of the line 709. Also, 0, 0, and 23 are respectively displayed in the columns of the real faults 712, the recognition errors 713, and the pickup errors 714 corresponding to the number of errors 711, and a bar 724 showing the number of pickup errors is also displayed in the column of the pickup errors 714. Also, 1 and a bar 725 showing the number of fault signs are displayed in the column of the fault signs 716 corresponding to the number of detected production fluctuations 715. Also, “2020-08-31 23:03:53” is displayed in the column of the latest detection time 717. In the column of the monitoring period error/production fluctuation detection state 718, a graph of the monitoring period error/production fluctuation detection state is displayed showing the number of errors and the number of detected production fluctuations during the period from 17:00 on Aug. 31, 2020 to 9:00 on Sep. 1, 2020 in time series. This graph of the monitoring period error/production fluctuation detection state shows that one pickup error, one pickup error, and three pickup errors were detected in time series, an operation instruction notification was given after the three pickup errors were detected, the instructed operation was performed, and thereafter one fault sign was detected.

(Screen for Manager (Operation Instruction Issuing Screen))

FIG. 11 shows a display example of the operation instruction issuing screen 80. This operation instruction issuing screen 80 is displayed when the details screen display button 720 displayed together with an icon in the column of the status in the line condition data display screen shown in FIG. 8 is selected. In FIG. 11, leader lines associated with reference numerals are drawn as broken lines to distinguish them from lines displayed in the screen.

The operation instruction event history 810 of the past 7 days is displayed as a table in an upper portion of the operation instruction issuing screen 80. Also, the operation instruction issuing screen 80 includes, in a lower left portion thereof, the new operation instruction issuing region 820 that enables the manager to input a text describing the content of a new operation instruction to be issued. Also, the operation instruction text change button 830 that is selected to change the text that has been input to the new operation instruction issuing region 820 and the operation instruction issuing button 840 that is selected to issue the operation instruction input to the new operation instruction issuing region 820 are displayed below the new operation instruction issuing region 820. Also, the operation instruction issuing screen 80 includes, in a lower right portion thereof, the operation instruction image region 850 in which an image of an operation instruction to be displayed in the operator terminal 20 is displayed. The operation instruction image region 850 enables the manager to check the content of display of the operation instruction to be issued. Here, the new operation instruction issuing region 820, the operation instruction text change button 830, and the operation instruction issuing button 840 constitute the additional operation instruction input unit 13.

The following describes details of the operation instruction event history 810 shown in FIG. 11.

The table of the operation instruction event history 810 includes five items: date and time 811, event content 812, status 813, operation instruction 814, and renotification 815. One row is allocated to each operation instruction event. The date and time at which the event occurred are displayed in the column of the date and time 811, the content of the event is displayed in the column of the event content 812, any of the icons showing the status of operation instructions described above with reference to FIG. 9 is displayed in the column of the status 813, the text of the operation instruction is displayed in the column of the operation instruction 814, and the renotification button 816 for giving a renotification is displayed in the column of the renotification 815. Here, the renotification button 816 constitutes the additional operation instruction input unit 13. Operation instruction events are displayed in time series from the top to the bottom in the operation instruction event history 810, and the latest operation instruction event is displayed in the bottom row.

The following describes a specific display example of the operation instruction event history 810. This display example is the operation instruction issuing screen displayed when the details screen display button 720 displayed together with the icon 719 in the column of the status 706 for the individual alert related information 705*a* is selected in the alert list 705 displayed in the line condition data display screen 70 shown in FIG. 8.

In the first row of the operation instruction event history 810, “2020/08/28 10:54” is displayed in the column of the date and time 811, “FREQUENT OCCURRENCE OF COMPONENT PICKUP ERRORS WAS DETECTED" is displayed in the column of the event content 812, the icon 719*c* indicating that "an improvement operation has not been assigned" is displayed in the column of the status 813, nothing is displayed in the column of the operation instruction 814, and the renotification button 816 is not displayed in the column of the renotification 815.

In the second row of the operation instruction event history 810, "2020/08/29 23:07" is displayed in the column of the date and time 811, "MANUAL NOTIFICATION OPERATION WAS PERFORMED" is displayed in the column of the event content 812, the icon 719*d* indicating that "the number of notifications has exceeded the maximum number of simultaneous notifications (display was ended)" is displayed in the column of the status 813, "PLEASE PERFORM DEVICE MAINTENANCE OF THE NOZZLE" is displayed in the column of the operation instruction 814, and the renotification button 816 is displayed in the column of the renotification 815.

That is, it can be recognized that the manager performed a manual notification operation at 23:07 on 2020/08/29 to issue the operation instruction "please perform device maintenance of the nozzle", but display of the operation instruction in the operator terminal 20 was ended without the operation being performed by the operator.

In the third row of the operation instruction event history 810, "2020/08/31 15:31" is displayed in the column of the date and time 811, "RENOTIFICATION OPERATION WAS PERFORMED" is displayed in the column of the event content 812, the icon 719*b* indicating that "an improvement operation has been done" is displayed in the column of the status 813, "PLEASE PERFORM DEVICE MAINTENANCE OF THE NOZZLE" is displayed in the column of the operation instruction 814, and the renotification button 816 is not displayed in the column of the renotification 815.

In the fourth row of the operation instruction event history 810, "2020/09/01 08:10" is displayed in the column of the date and time 811, "FREQUENT OCCURRENCE OF REAL FAULTS WAS DETECTED" is displayed in the column of the event content 812, the icon 719*a* indicating that "an operation instruction notification was given (currently displayed)" is displayed in the column of the status 813, "PLEASE REPLACE THE NOZZLE" is displayed in the column of the operation instruction 814, and the renotification button 816 is displayed in the column of the renotification 815.

Next, the following describes the new operation instruction issuing region 820 in more detail.

As described above, frequent occurrence of real faults was detected in the event displayed in the fourth row of the operation instruction event history 810, and a notification of the operation instruction "please replace the nozzle" was given to the operator terminal 20, but the status of the operation instruction is "an operation instruction notification was given (currently displayed)" as indicated by the icon 719*a* displayed in the column of the status 813. Here, the renotification button 816 is displayed in the column of the renotification 815, and accordingly, it is possible to select the renotification button 816 to again display the operation instruction "please replace the nozzle" in the operator terminal 20 and notify the operator of the instruction, but it is also possible for the manager to issue a new operation instruction using the new operation instruction issuing region 820 if the manager wants to change the default wording of the operation instruction prepared in advance. In such a case, when the manager selects the operation instruction text change button 830, input to the text box of the new operation instruction issuing region 820 is enabled, and the manager inputs a new operation instruction to the new operation instruction issuing region 820. Here, the manager inputs a new operation instruction "please prohibit use of the nozzle" to the new operation instruction issuing region 820. Then, when the manager selects the operation instruction issuing button 840, the operation instruction "please prohibit use of the nozzle" created by temporarily changing the default operation instruction can be issued.

Also, an image of a screen to be displayed in the operator terminal 20, which includes the operation instruction to be issued, is displayed in the operation instruction image region 850. Here, the operation instruction "please prohibit use of the nozzle", which has been input to the new operation instruction issuing region 820 by the manager, is displayed as an image of a screen to be displayed in the operator terminal 20, and the manager can check the content of the operation instruction to be issued.

When the manager gives a renotification of an operation instruction or issues a new operation instruction in the operation instruction issuing screen 80, the screen returns to the line condition data display screen 70 displaying the alert list.

The operation instruction issuing screen 80 described above enables the manager to check a history of operation instructions that have been issued and the execution status of the instructed operations. Also, the operation instruction issuing screen 80 enables the manager to give a renotification of an operation instruction of which the instructed operation has not been performed or that has not been read. Furthermore, the operation instruction issuing screen 80 enables the manager to edit the wording of an operation instruction and issue a new operation instruction different from the default operation instruction.

(Operator Terminal)

Figure 12:
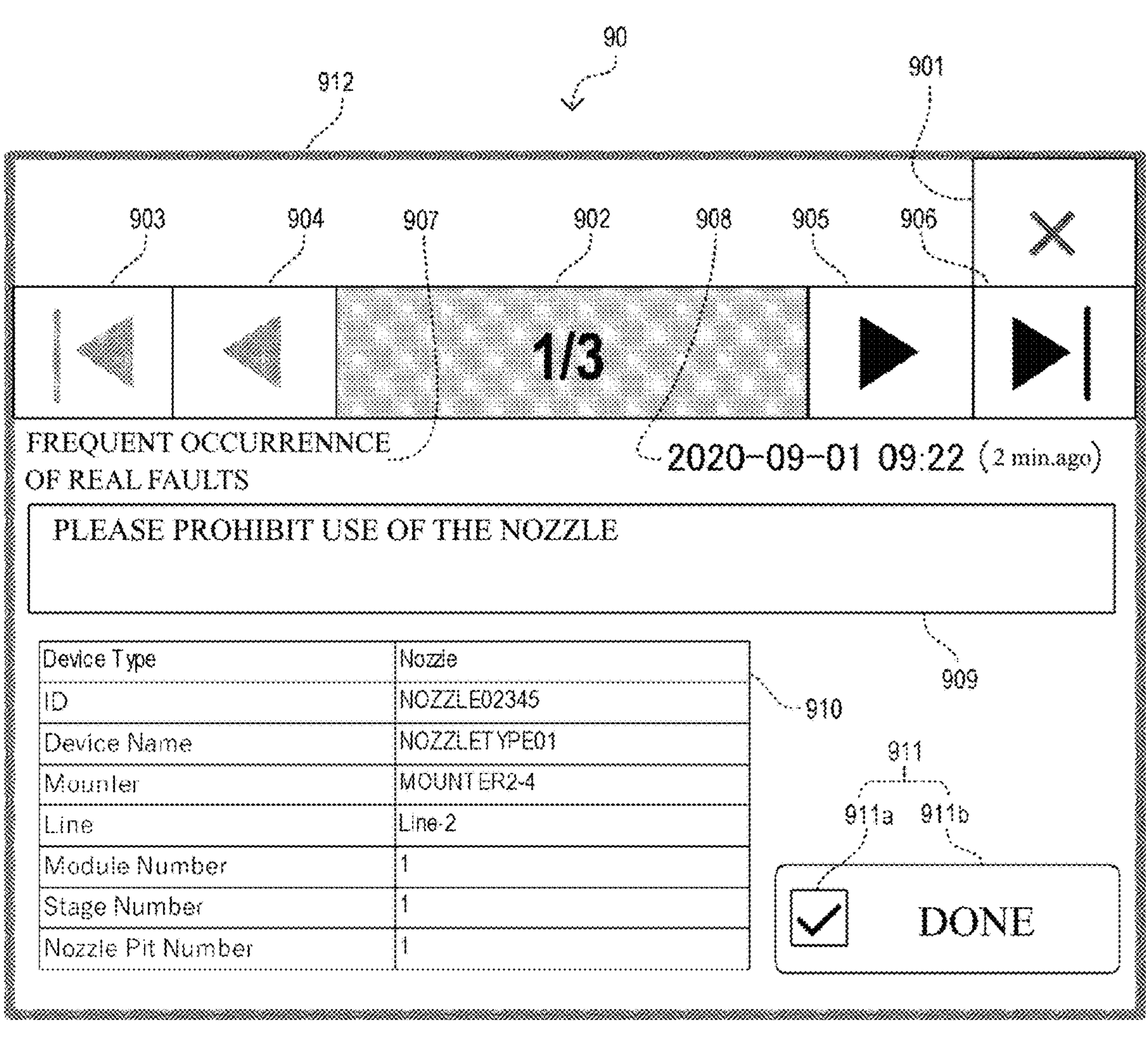
FIG. 12 is a diagram showing an operation instruction display screen in the operator terminal according to an embodiment of the present invention.

FIG. 12 shows an example of an operation instruction display screen 90 displayed in the operation instruction display unit 22 of the operator terminal 20. In FIG. 12, leader lines associated with reference numerals are drawn as broken lines to distinguish them from lines displayed in the screen.

This is a screen displaying an operation instruction given as a pop-up notification in the operator terminal 20 that is checked by an operator. In this operation instruction display screen 90, the content of the notification is changed according to the target operation type (component No., mounting device, etc.) for each target line. The target line and the target operation type corresponding to the operator terminal 20 are obtained by referring to a file that was set at the time of installation, when the application is booted.

A button 901 for closing the operation instruction display screen 90 is displayed at the right end in the top region of the operation instruction display screen 90, and "⅓" is displayed as the number of notifications 902 at the center in a region below the top region. The figure displayed as the number of notifications 902 is a fraction whose denominator is the total number of operation instructions given to the operator terminal 20 and whose numerator indicates the order of the currently-displayed operation instruction among the operation instructions. Here, the figure indicates that the first operation instruction among three operation instructions is being displayed. Therefore, the operator can recognize the number of operations to be performed. On the left and right of the number of notifications 902, there are buttons for making the screen transition to screens displaying other operation instructions when there are a plurality of operation instructions. A first instruction display button 903 for displaying the first operation instruction is displayed at the left end, and a preceding instruction display button 904 for displaying a preceding operation instruction is displayed on the right of the first instruction display button 903. A next instruction display button 905 for displaying the next operation instruction is displayed on the right of the number of notifications 902, and a last instruction display button 906 for displaying the last operation instruction is displayed at the right end. Here, the first operation instruction of three operation instructions is displayed, and therefore, the first instruction display button 903 and the preceding instruction display button 904 for displaying preceding operation instructions are inactive, and the next instruction display button 905 and the last instruction display button 906 for displaying following operation instructions are active. Here, the background of the number of notifications 902 may be displayed in a color, such as blue, that is different from the color of other display regions, and the figure may be displayed in white depending on the background color so that the operator can clearly recognize the total number of operation instructions and the order of the displayed operation instruction. Also, out of the first instruction display button 903, the preceding instruction display button 904, the next instruction display button 905, and the last instruction display button 906, active buttons may be displayed in red, for example. When the number of notifications 902 and active buttons such as the first instruction display button 903 are displayed in different display manners, the operator can clearly recognize the presence of operation instructions other than the displayed operation instruction and operations necessary to display the other operation instructions.

In an upper center region of the operation instruction display screen 90, abnormality content 907 such as "FREQUENT OCCURRENCE OF REAL FAULTS" and notification timing information 908, such as "2020-09-01 09:11 (2 min. ago)", including notification date and time of the operation instruction and a time elapsed therefrom are displayed. The notification timing information 908 enables the operator to recognize the time when the notification of the operation instruction was given and the time elapsed therefrom, and accordingly recognize whether or not the operation instruction is in real time.

The text of the operation instruction such as "PLEASE REPLACE THE NOZZLE" is displayed in an operation instruction display region 909 in a lower center region of the operation instruction display screen 90.

Target identification information 910 for identifying the target of the operation instruction is displayed in a lower left region of the operation instruction display screen 90. Specifically, as the target identification information 910, "Nozzle" is displayed as Device Type, "NOZZLE02345" is displayed as ID, "NOZZLETYPE01" is displayed as Device Name, "MOUNTER2-4" is displayed as Mounter identifying a mounter, "Line-2" is displayed as Line identifying a line, "1" is displayed as Module Number, "1" is displayed as Stage Number, and "1" is displayed as Nozzle Pit Number.

Also, an execution status registration section 911 is provided in a lower right region of the operation instruction display screen 90. The execution status registration section 911 includes a checkbox 911*a* and a text box 911*b*. Two types of status, namely, "not done" and "done" are indicated by the execution status registration section 911, and when the text box 911*b* showing "DONE" is clicked or touched, the text box 911*b* is activated. When the text box 911*b* showing "DONE" is activated, a check mark is displayed in the checkbox 911*a* and information indicating that the operator performed the operation corresponding to the operation instruction displayed in the operation instruction display screen 90 is transmitted via the operation information transmitting unit 24 to the operation information receiving unit 122 of the management apparatus 100. Here, the execution status registration section 911 constitutes the operation information input unit 23. When the text box 911*b* showing "DONE" is inactive, the operation corresponding to the operation instruction displayed in the operation instruction display screen 90 has not been performed.

In a case where operation instructions given to the operator terminal 20 include an operation instruction of which the corresponding operation has not been performed, a window frame 912 is displayed in red and blinked at intervals of 1 second to emphasize the display. This enables the operator to easily and clearly recognize the presence of the operation instruction for which the corresponding operation has not been performed.

It is desirable to determine sizes of the buttons and the like in accordance with the specifications of the inspection apparatus Y2 or the like so that the operation instruction display screen can be operated using a touch panel.

In the case of operations relating to the mounter, it is envisaged that the operator will see a screen of the inspection apparatus Y2 from the mounter X2. Accordingly, it is desirable to use an emphasizing color to make it easy to visually recognize cases where there is an operation that has not been performed.

Also, necessary information is displayed in such a manner that the operator need not scroll the screen so that the operator can recognize the content of an operation in the single screen without the need to perform a screen transition operation such as touching the screen. However, the number of operations displayed at the same time is limited to one to make it easy for the operator to recognize the content of the operation.

Operation instruction obtaining processing is performed every 10 seconds in the operator terminal 20 to display operation instructions in real time, and the status is automatically updated when it is changed, in view of cases where the status is changed by another operator terminal 20. However, the operation instruction itself is not replaced.

In a case where there are a plurality of operation instructions, the operation instructions are displayed in descending order of priority in the operation instruction display screen.

The operation instruction display screen of the operator terminal 20 described above makes it possible to notify the operator of an operation instruction relating to frequent occurrence of quality fluctuations or an operation instruction corresponding to an alert (re)issued by the manager through the manager terminal 10, and enables the operator to immediately perform the corresponding operation.

Also, the operator inputs information indicating whether or not the instructed operation has been performed to the operation instruction display screen of the operator terminal 20, and the information is transmitted to the management apparatus 100. The management apparatus 100 creates line condition data including the execution status and transmits the data to the manager terminal 10, and therefore, the manager can check the execution status of the instructed operation in the line condition data display screen of the manager terminal 10.

The management system 1 including at least the manager terminal 10 and the operator terminal 20 as described above makes it possible to integrate the manager-side cycle including Sab1, Sa2, Sa3, and Sab1, and the operator-side cycle including Sb0, Sab1, Sb2, Sb3 (Sb0), and Sab1 and make these cycles function in an adaptable manner with an operation instruction (Sab1) serving as a trigger as shown in the schematic diagram of FIG. 14, and to support realization of the function of repeating the quality improvement cycle, which starts from abnormality detection (Sb0) and follows the process from the operation instruction (Sab1) to the next operation instruction (Sab1), while improving the cycle itself.

<Supplementary Note 1>

A quality improvement support apparatus (10) that supports improvement in quality of a product produced by a production facility (X1 to X3, Y1 to Y4), the quality improvement support apparatus including:

a display unit (12) that displays production condition information (705, 705*a* to 705*f*) in which identification information (707), operation instruction state information (706), and a condition evaluation index (711, 715) are associated with each other for each operation instruction, the identification information (707) identifying an improvement target that is a production member (61, 62, 63) or a component (P) included in the production facility (X1 to X3, Y1 to Y4) and that is to be improved to improve quality of the product, the operation instruction state information (706) indicating a state of an operation instruction to perform an operation on the production facility (X1 to X3, Y1 to Y4) in relation to the improvement target, the condition evaluation index (711, 715) being an index for evaluating conditions of the production facility (X1 to X3, Y1 to Y4) relating to the quality of the product; and an additional operation instruction accepting unit (816, 820, 830, 840) that accepts an additional operation instruction for additionally giving an instruction to perform an operation on the production facility (X1 to X3, Y1 to Y4).

INDEX TO THE REFERENCE NUMERALS

10 . . . quality improvement support apparatus, 61 . . . feeder, 62 . . . head, 63 . . . nozzle, 705 . . . alert list, 705*a* to 705*f* . . . individual alert related information, 706 . . . status, 707 . . . device type, 708 . . . device ID, 709 . . . line, 711 . . . number of errors, 715 . . . number of detected production fluctuations, 718 . . . monitoring period error/production fluctuation detection state, 816 . . . renotification button, 820 . . . new operation instruction issuing region, 830 . . . operation instruction text change button, 840 . . . operation instruction issuing button, X1 to X3, Y1 to Y4 . . . production facility

The invention claimed is:

1. A quality improvement support apparatus that supports improvement in quality of a product produced by a production facility, the quality improvement support apparatus comprising:

a display that displays production condition information in which identification information, operation instruction state information, and a condition evaluation index are associated with each other for each operation instruction, the identification information identifying an improvement target that is a production member or a component included in the production facility and that is to be improved to improve quality of the product, the operation instruction state information indicating a state of an operation instruction to perform an operation on the production facility in relation to the improvement target, the condition evaluation index being an index for evaluating conditions of the production facility relating to the quality of the product; and an additional operation instruction acceptor that accepts an additional operation instruction for giving an instruction to perform an operation on the production facility, wherein the display displays history information indicating the operation instruction together with the additional operation instruction acceptor, the operation instruction having been previously issued in relation to the improvement target identified by the identification information included in the production condition information, and the additional operation instruction acceptor accepts a new operation instruction having the same content as the previously issued operation instruction included in the history information.

2. The quality improvement support apparatus according to claim 1, wherein the operation instruction state information includes whether or not the operation instructed with the operation instruction has been performed.

3. The quality improvement support apparatus according to claim 1, wherein the production condition information includes chronological condition information showing the condition evaluation index and the operation instruction state information in a predetermined period in time series.

4. The quality improvement support apparatus according to claim 1, further comprising a history information designator that accepts designation of any of a plurality of pieces of the production condition information displayed in the display and causes the display to display the history information relating to an improvement target identified by the identification information included in the designated production condition information.

5. A quality improvement support system comprising:

the quality improvement support apparatus according to claim 1; and an operation instruction receiver that receives the operation instruction including the additional operation instruction and includes:

an operation instruction state information obtainer that obtains the operation instruction state information regarding the operation instruction; and an operation instruction state information transmitter that transmits the obtained operation instruction state information, wherein the operation instruction state information displayed in the display of the quality improvement support apparatus is updated based on the operation instruction state information obtained by the operation instruction state information obtainer.

6. The quality improvement support system according to claim 5, wherein the operation instruction receiver further includes an instruction content display that displays content of the received operation instruction, and the operation instruction state information obtainer accepts input of the operation instruction state information from a user of the operation instruction receiver.

7. The quality improvement support apparatus according to claim 1, wherein the history information is displayed as an operation instruction event history in a table, the table including a date and time column, an event content column, a status column, an operation instruction column, and a renotification column, one row being allocated to each of a plurality of operation instruction events, and wherein a renotification button constituting the additional operation instruction acceptor is displayed in the renotification column in a row corresponding to at least one operation instruction event among the plurality of operation instruction events.

8. The quality improvement support apparatus according to claim 1, wherein the display displays, together with the operation instruction state information in the production condition information, a details screen display button corresponding to each operation instruction, and wherein, in response to selection of the details screen display button, the display displays the history information relating to the improvement target identified by the identification information included in the selected production condition information.

9. The quality improvement support apparatus according to claim 1, wherein the display further displays a new operation instruction issuing region configured to receive text of another new operation instruction, an operation instruction text change button, an operation instruction issuing button, and an operation instruction image region in which an image of a screen including the another new operation instruction to be displayed in an operator terminal is displayed.

10. The quality improvement support apparatus according to claim 1, wherein the display displays an operation instruction issuing screen including the history information, a new operation instruction issuing region configured to receive another new operation instruction, and an operation instruction image region displaying an image of a screen including the another new operation instruction to be displayed in an operator terminal.

* * * * *